United States Patent
Soldo et al.

(10) Patent No.: US 12,469,009 B2
(45) Date of Patent: Nov. 11, 2025

(54) SYSTEM METHOD AND APPARATUS FOR A SOFTWARE APPLICATION TO COLLECT, ANALYZE AND DISTRIBUTE DATA FOR A CONSTRUCTION COMPANY PROJECT ENVIRONMENT

(71) Applicant: Haugland Group, LLC, Melville, NY (US)

(72) Inventors: Jonathan J Soldo, South Huntington, NY (US); Jonathan Andrew Lally, Brookhaven, NY (US); Anthony Murdukhayev, Levittown, NY (US); John William Reynolds, III, East Setauket, NY (US); Christopher P Cimino, Seaford, NY (US)

(73) Assignee: Haugland Group LLC, Melville, NY (US)

( * ) Notice: Subject to any disclaimer, the term of this patent is extended or adjusted under 35 U.S.C. 154(b) by 304 days.

(21) Appl. No.: 16/864,511

(22) Filed: May 1, 2020

(65) Prior Publication Data

US 2021/0342784 A1     Nov. 4, 2021

(51) Int. Cl.
*G06Q 10/10* (2023.01)
*G06F 16/27* (2019.01)
*G06Q 10/0631* (2023.01)
*G06Q 10/0639* (2023.01)
*G06Q 10/105* (2023.01)
(Continued)

(52) U.S. Cl.
CPC .......... *G06Q 10/103* (2013.01); *G06F 16/27* (2019.01); *G06Q 10/063112* (2013.01); *G06Q 10/063118* (2013.01); *G06Q 10/0639* (2013.01); *G06Q 10/105* (2013.01); *G06Q 10/1091* (2013.01); *G06Q 30/04* (2013.01); *G06Q 40/125* (2013.12);
(Continued)

(58) Field of Classification Search
CPC ............... G06Q 10/00; G06Q 10/0631; G06Q 10/06312; G06Q 10/06315; G06Q 10/06375; G06Q 10/06393; G06Q 30/02; G06F 11/3006; G06F 11/26; G06F 17/189; H04L 43/08; G05B 23/0283; G05B 23/0286; G05B 23/00; G05B 23/0205; G05B 23/0262
See application file for complete search history.

(56) References Cited

U.S. PATENT DOCUMENTS 9,826,008 B1 * 11/2017 Samuel ................ G06Q 50/01
2007/0027732 A1 * 2/2007 Hudgens .......... G06Q 10/06312
                                                                                705/7.15
(Continued)

OTHER PUBLICATIONS

Salleh, Review of Nobile Workforce Management System for Electricity Supply Industries, 2009 2nd International Conference on Computer Science and its Applications, Dec. 1, 2009, pp. 1-5 (Year: 2009).*

*Primary Examiner* — Robert D Rines
(74) *Attorney, Agent, or Firm* — Offit Kurman; Tod A. Kupstas

(57) ABSTRACT

A system, method and apparatus is described for a dynamic mobile application that provides a real time collection, analysis and reporting information management platform for building and construction projects, emergency services and disaster management tasks. The mobile device application includes multiple modules interconnected including a finance module, an operations module, a utilities module and a safety module.

19 Claims, 30 Drawing Sheets

(51) Int. Cl.
  *G06Q 10/1091* (2023.01)
  *G06Q 30/04* (2012.01)
  *G06Q 40/12* (2023.01)
  *H04L 9/40* (2022.01)
  *G06F 3/0482* (2013.01)
  *G06F 3/0484* (2022.01)
  *G06Q 50/08* (2012.01)

(52) U.S. Cl.
  CPC ............ *H04L 63/08* (2013.01); *G06F 3/0482* (2013.01); *G06F 3/0484* (2013.01); *G06Q 50/08* (2013.01)

(56) References Cited

U.S. PATENT DOCUMENTS

| | | | | |
|---|---|---|---|---|
| 2013/0311894 | A1* | 11/2013 | Rexer | G06F 21/629 |
| | | | | 715/741 |
| 2016/0132816 | A1* | 5/2016 | Lush | G06Q 10/063112 |
| | | | | 705/7.14 |
| 2016/0217422 | A1* | 7/2016 | Dujisin | G06Q 10/1091 |
| 2017/0091685 | A1* | 3/2017 | Karabin | G06Q 50/08 |
| 2017/0286911 | A1* | 10/2017 | Randle, II | H04L 67/12 |
| 2018/0096273 | A1* | 4/2018 | Arnott | G06Q 10/00 |
| 2019/0066052 | A1* | 2/2019 | Boutros | G06F 16/248 |
| 2021/0073694 | A1* | 3/2021 | Yellin | G06Q 10/06313 |
| 2021/0240312 | A1* | 8/2021 | Wohlstadter | G16H 10/40 |

* cited by examiner

SYSTEM METHOD AND APPARATUS FOR A SOFTWARE APPLICATION TO COLLECT, ANALYZE AND DISTRIBUTE DATA FOR A CONSTRUCTION COMPANY PROJECT ENVIRONMENT

BACKGROUND OF THE INVENTION

1. Field of the Present Invention

The present invention relates generally to an apparatus, system and method for a dynamic mobile application that provides a real time collection, analysis and reporting information management platform for building and construction projects, commercial electric projects, overhead lines work, underground electric projects, emergency services and disaster management tasks. More specifically, the invention relates to a mobile device application having multiple modules interconnected including at least a finance module, an operations module, a utilities module and a safety module.

2. General Background

In the project management industry, the ability for managers and contractors to have real time information about each project instantly is crucial for job efficiency, safety and finances. Project management companies typically have multiple job sites active at any one time. The occurrence of a disaster, either intentional, accidental or natural disaster, increases the pressure on project management companies to perform efficiently.

Real time information related to the various projects can include employee information, equipment location, conditions at the location, project requirements, safety conditions, future planning and other dynamic information related to each project.

Management of the various types of project management information has traditionally been processed and maintained in paper. Coordination of the office workforce and the management team in the field to handle operational administrative tasks that typically were done either via paper or as technology occurred were done by scanning. This traditional process creates inefficiencies. Adding multiple people to the processes creates potential limitless failure points that occur on the exchange of information.

There is a need for a solution providing real time data capture at the source of a project location and dynamic dissemination to an entire workforce team of that information via a common platform where such information can be analyzed and then assimilated out to other parties that need to approve it, process it, or make decisions based on that information.

SUMMARY OF THE INVENTION

The present invention includes an apparatus, system and method for a dynamic mobile application that provides a real time collection, analysis and reporting information management platform for building and construction projects, emergency services and disaster management tasks.

The ability of field personnel and management to have access to real time project information requires a much-needed solution as provided by the present invention. An object of the present invention is to provide real time data to an entire enterprise workforce including management and field technicians to complete operational administrative tasks that typically were done either via paper or as technology occurred were done by customary scanning technologies.

Another object of the present invention is to provide a single common platform application available to an entire project management workforce to provide project information including employment information, employee expense applications and information on equipment location, job site information and photos, crew information and planning, safety information and third-party review coordination.

Another object of the present invention is to allow real time uploading and enterprise wide dissemination of the project management information via a common platform for efficiency analysis, processing and management decision making steps.

In a first embodiment, the present invention include a method to support a project management enterprise, the method including providing an enterprise wide mobile device application with a graphical user interface, the mobile device application including software computer code programmed to provide a user a login function, where an authentication step determines whether to grant the user access to the mobile device application viewable to user via the graphical user interface, determine whether the user possesses current project data, determine whether the user possesses current communication data, provide the user with equipment location data, provide the user with a photo collection option, provide the user with at least one employee data, provide the user with time keeping data for the at least one employee and to update, upload and store the project data, the communication data, the equipment location data, the employee data and the time keeping data to a database programmed to store the data.

The step of determining whether the user possesses current project data includes navigating a data synchronization step for said project data in order to synchronize the mobile application and said database by accessing, navigating the user to an application launcher module viewable to user via the graphical user interface, determining a visibility of the application launcher module and rendering the application launcher module to provide the user access to the mobile application via the graphical user device.

The step of determining whether the user possesses current communication data including accessing the communication data stored in the database, displaying a determination notification viewable to user via the graphical user interface, providing the user a communication data input portal via the graphical user interface to upload new communication data, providing the user an expense data input portal via the graphical user interface to upload new expense data; and storing the new communication data and the new expense data input by the user in said database.

The step of providing the user with a photo collection option includes launching a job site photo module viewable to user via said graphical user interface, displaying at least one project listed in said database, determining the existence of a job site photo for said at least one project;

providing the user access to the job site photo, providing the user the ability to photograph the job site, uploading the job site photo to said database and providing access to the job site photo to the enterprise.

The step of providing the user with at least one employee data includes launching a workforce module viewable to the user via the graphical user interface, providing the user with at least one filtering option to search for employees stored in said database and providing the user the ability to select at least one employee for said project.

The step of providing the user with time keeping data for the at least one employee including launching a time sheet module viewable to the user via the graphical user interface, providing employee information, where the employee information includes default job and phase data, individual time entry data and next day crew compensation, providing a time sheet data generating operation including creating a time sheet entry, importing the time sheet entry into a payroll database and providing the time sheet data to at least one customer for said project.

The step of providing the user with at least one employee data for the at least one employee including allowing user to enter additional information for the at least one employee, allowing the user to perform a review of the at least one employee, displaying a skillset for the at least one employee, displaying assets assigned to the at least one employee, and selecting said assets to be checked out based upon predetermined criteria.

In a second embodiment, the present invention includes a system and apparatus to support a project management enterprise including an enterprise wide mobile device application with a graphical user interface, the mobile device application including software computer code, a login function module configured to authenticate a user and provide or deny access to the mobile device application, a project data module accessible by the login function module where the project data module is configured to house and update project data for the enterprise, a communication data module accessible by the login function module where the communications data module is configured to house and update communications data for the enterprise, an equipment location data module accessible by the login function module where the equipment location data module is configured to house and update equipment location data for the enterprise, a photo collection module accessible by the login function module where the photo collection module is configured to house and update photos for the enterprise and for providing the user with a means for photo collection, an employee data module accessible by the login function module where the employee data module is configured to house and update employee data for the enterprise including at least time keeping data for the employees and a database programmed to store the project data, the communication data, the equipment location data, the employee data and the time keeping data.

Some embodiments include an application launcher module configured to display the mobile application to the user via the graphical user display.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

Figure 22:
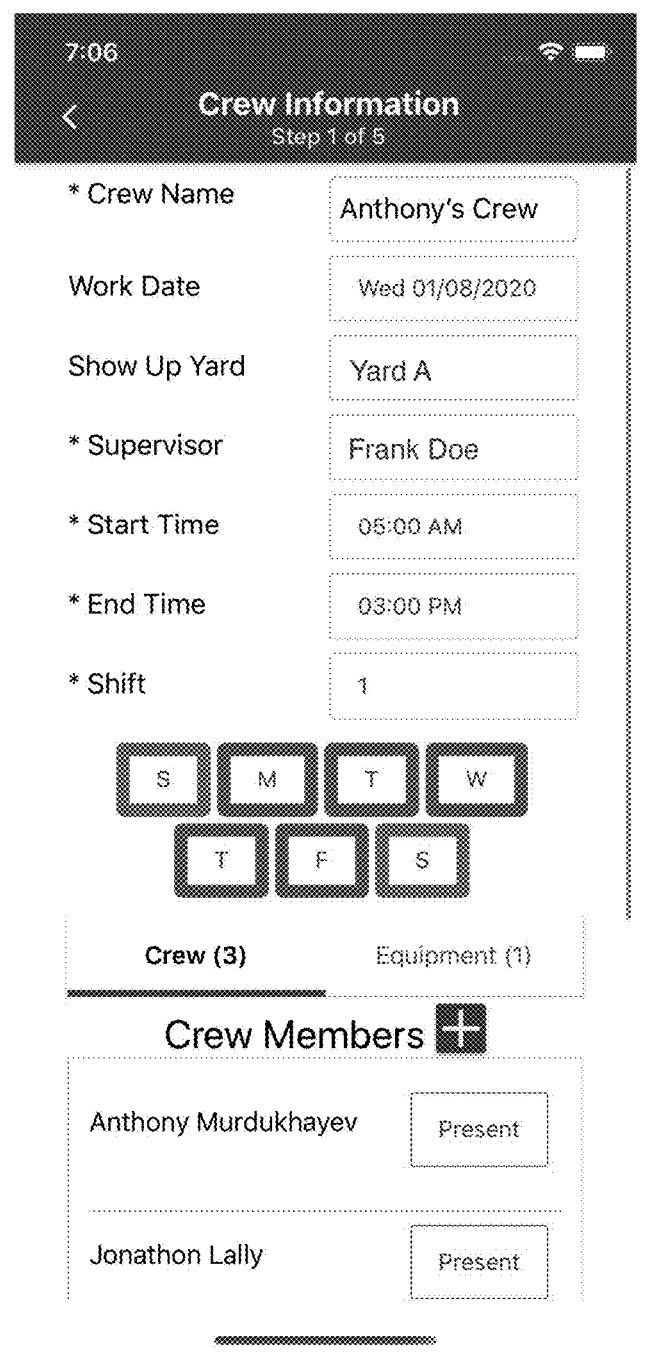
Figure 24:
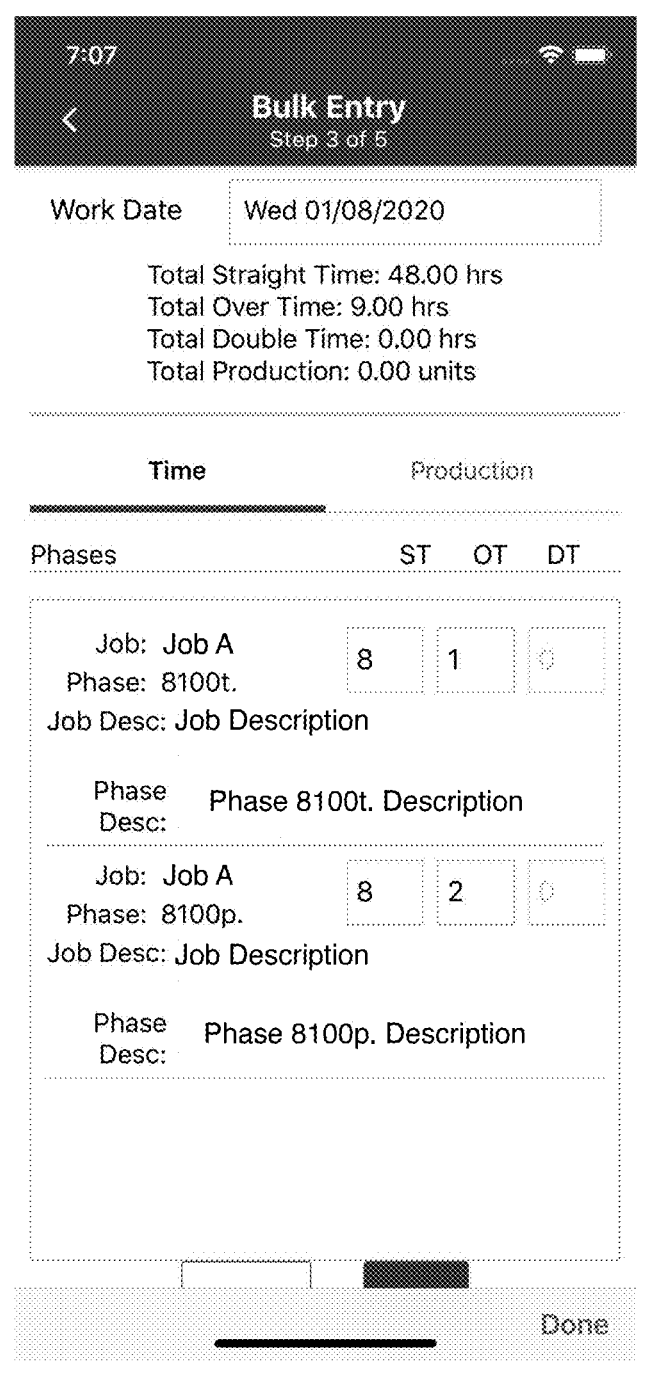
Figure 25:
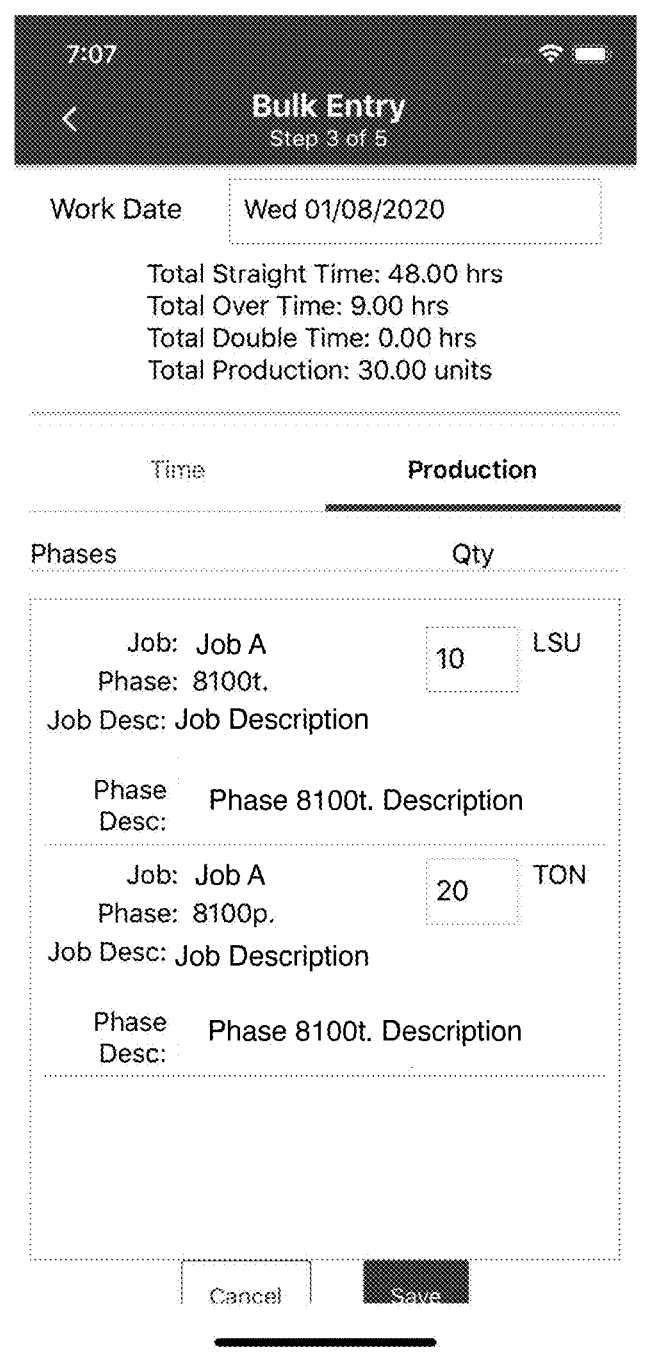

FIGS. 21-30 depict timesheet interfaces within the Timesheet Module of the mobile application in accordance with one embodiment of the present invention.

DETAILED DESCRIPTION OF THE PREFERRED EMBODIMENTS

The present disclosure will now be described more fully with reference the to the figures in which an embodiment of the present disclosure is shown. The subject matter of this disclosure may, however, be embodied in many different forms and should not be construed as being limited to the embodiments set forth herein.

Figure 1:
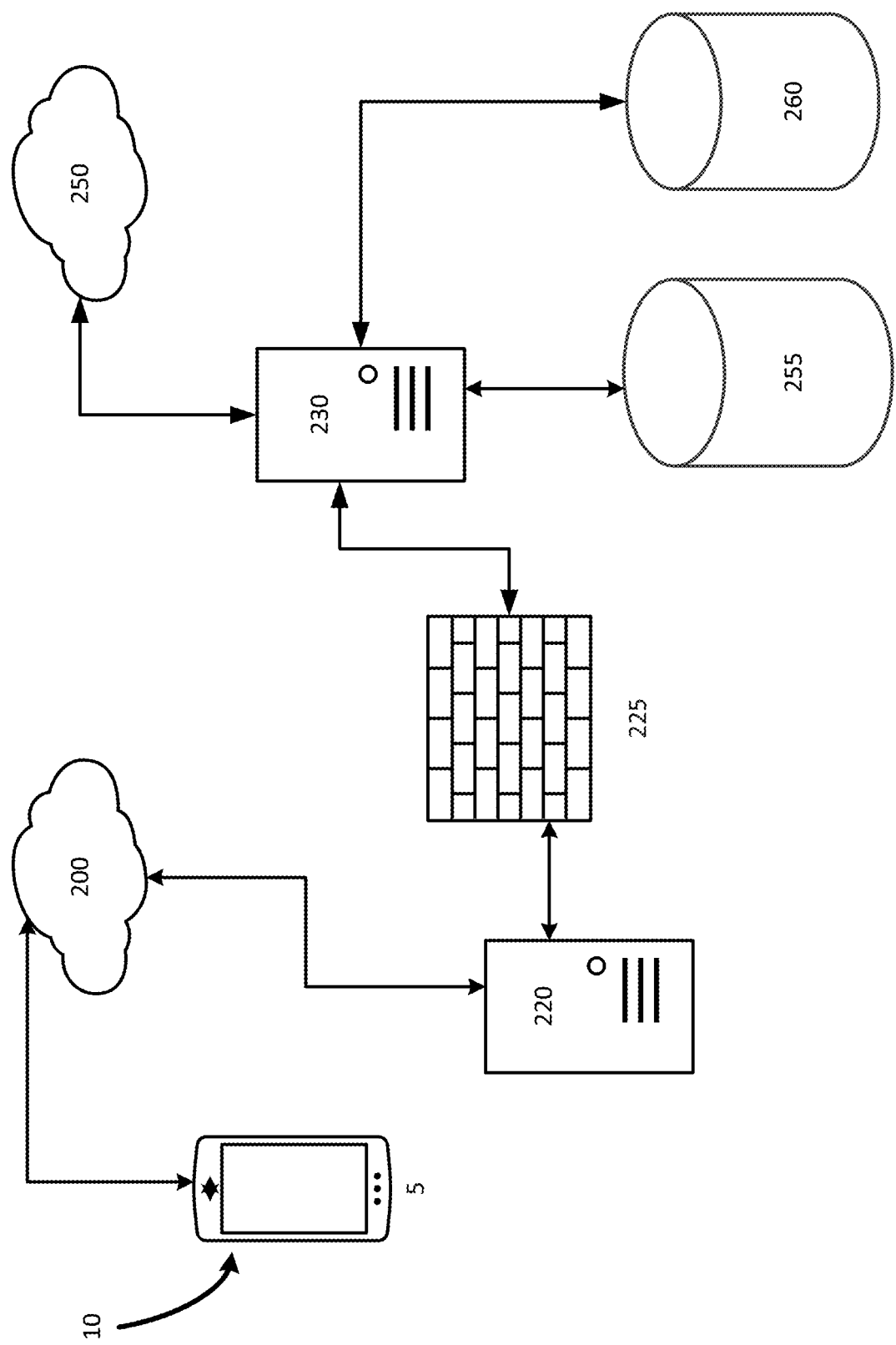
FIG. 1 depicts a typical computer environment within which the present invention operates according to one embodiment.

Referring now to FIG. 1 there is shown an overall architecture of the data communication between the various devices utilized in the present invention. The mobile application 10 residing on mobile device 5 will establish a connection with a perimeter server 220 via internet cloud communication 200. All requests and responses will be sent through the perimeter server 220. The perimeter server 220 lives outside of a company's domain but access is provided through firewall 225 to the internal API server 230.

The internal API server 230 has a shared responsibility of handling authentication, communicating with third party APIs 250 and accessing internal data stores 255 and 250 for data retrieval, manipulation and persistence.

Perimeter server 220 and internal API server 230 include software and algorithms having naming convention Perimeter-abc and Internal-abc. Perimeter server 220 includes a startup class function step. An initialize API steps follow the MVC architecture as outlined in Microsoft .net core. Perimeter server 220 also includes a program class function that initializes and starts the Web Host service. On creation, options are provided and listening services are started to allow inbound requests.

Perimeter server 220 also includes a call function step known as "HG Strike Force Controller" where this class function step will take in a request and forward it to the internal API server 230. Once the internal API server 230 provides a response, that response will be forwarded to the caller. In context to mobile application 10, the caller is the mobile application but in general, may be any piece of software including but not limited to Web Applications, Mobile Applications, Desktop Applications, etc. All communication can be accomplished using JSON or other similar functioning software.

Internal API server 230 also includes an Active Directory Controller function that is responsible for communication to and from active directory controllers. Based on the invoked function, the API offers an array of possible endpoints for a client to leverage.

Additional steps include a Get Login Information For Current User function that collects the information of the user which made the call.

There is a Get Active Directory Group List For User function that collects the active directory groups the passed in user is associated with. A Get Active Directory Group List For Current User function will collect the active directory groups the calling user is associated with.

Figure 2:
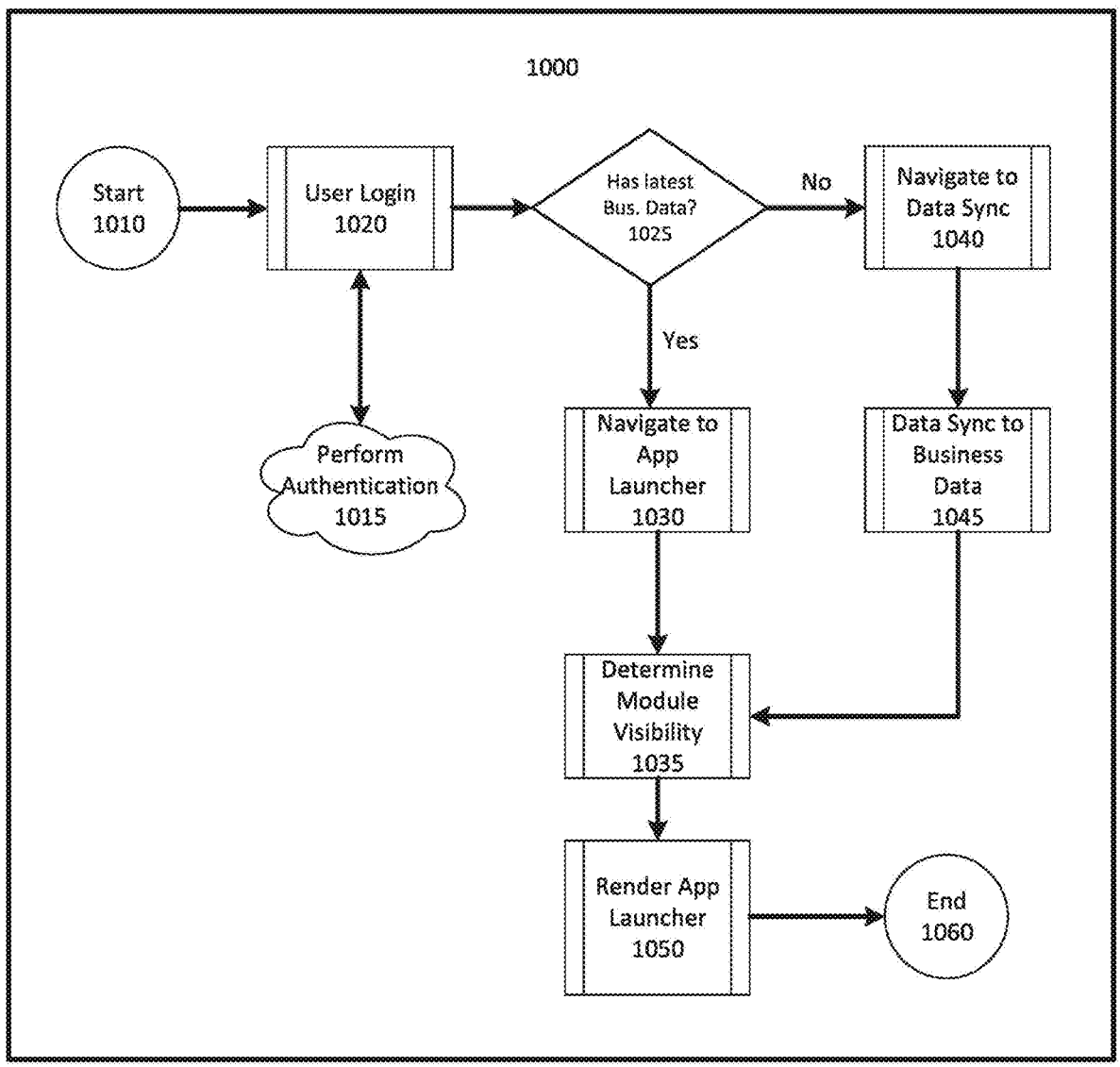
FIG. 2 depicts a series of steps 1000 related to a login procedure for the mobile application according to one embodiment of the present invention.

Referring now to FIG. 2 there is shown a series of flow diagram steps within a login module 1000 related to login requests will occur on each login. Any time the mobile application 10 is opened 1010 and every time the application is launched 1020, there is an authenticate perform step 1015 within the system environment in order to determine the current permission level of the authenticated user. This handles which modules are visible/enabled for the user to access.

In the case of an internal mobile guest controller, the controller is responsible for allowing guest accounts to use the mobile application 10. In the event a third party requires access to the mobile application 10, they can be provided with an access code. This code will then reconcile to a user account specific for this use case. When the user logs in with this code, they will gain access to a subset of features from this API.

Implementing a guest login function is based on the information provided and the user will be allowed to log in to the application without being an employee while maintaining user accountability and visibility.

Prior to logging the user in to the application, an audit step 1025 is performed to identify the user is logging in to the guest account. Information includes the code which was used, the device's unique identifier (set by the device manufacturer), IP Address, Name, Phone Number, Email, Manufacturer of the device, OS Version and App Version.

After step 1025, there can be a data sync step 1040 where the data 1045 is reviewed and synced to the user device based on the security level of the logged in user 5. If the user is authenticated the mobile application 10 is launched 1030 where module visibility is determined 1035 and the application 10 is rendered 1050 as the login procedure concludes 1060.

Figure 3:
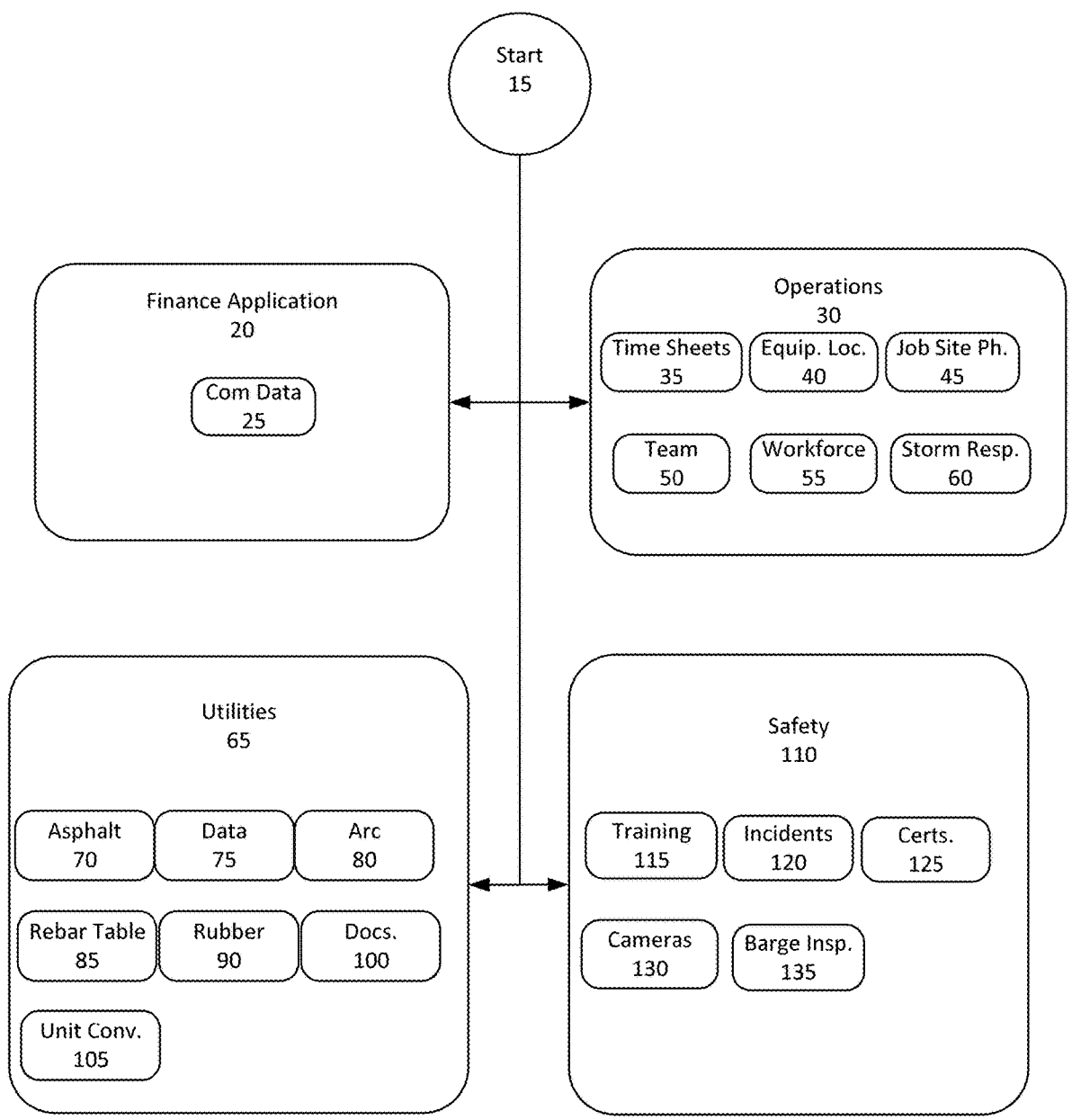
FIG. 3 depicts a flow diagram tree for a typical user interaction experience post login according to one embodiment of the present invention.

FIG. 3 shows a flow diagram decision tree for a typical user interaction experience post login. The user starts 15 on an application list, with the ability to launch the module in which they need to complete their specific workflow. All modules described herein are under a specific security context. If the user is not in the group which is tied to that module, the user will not be able to launch the module.

Modules can include a finance application 20 with a communication data module 25 (with steps 1100 discussed below in FIG. 4). There is an operations module 30 having additional modules including time sheets 35, equipment locations 40, job site photos 45, team 50 workforce 55 and storm response 60.

In a utilities module 65 there exists various calculators such as asphalt 70, data 70 Arc 80, rebar table 85, rubber 90. There is also a documents section 100 and a unit converter 105.

In a safety module 110 there exists various applications including training, 115, incidents, 120, certifications 125, camera 130 and barge inspection 135.

Figure 4:
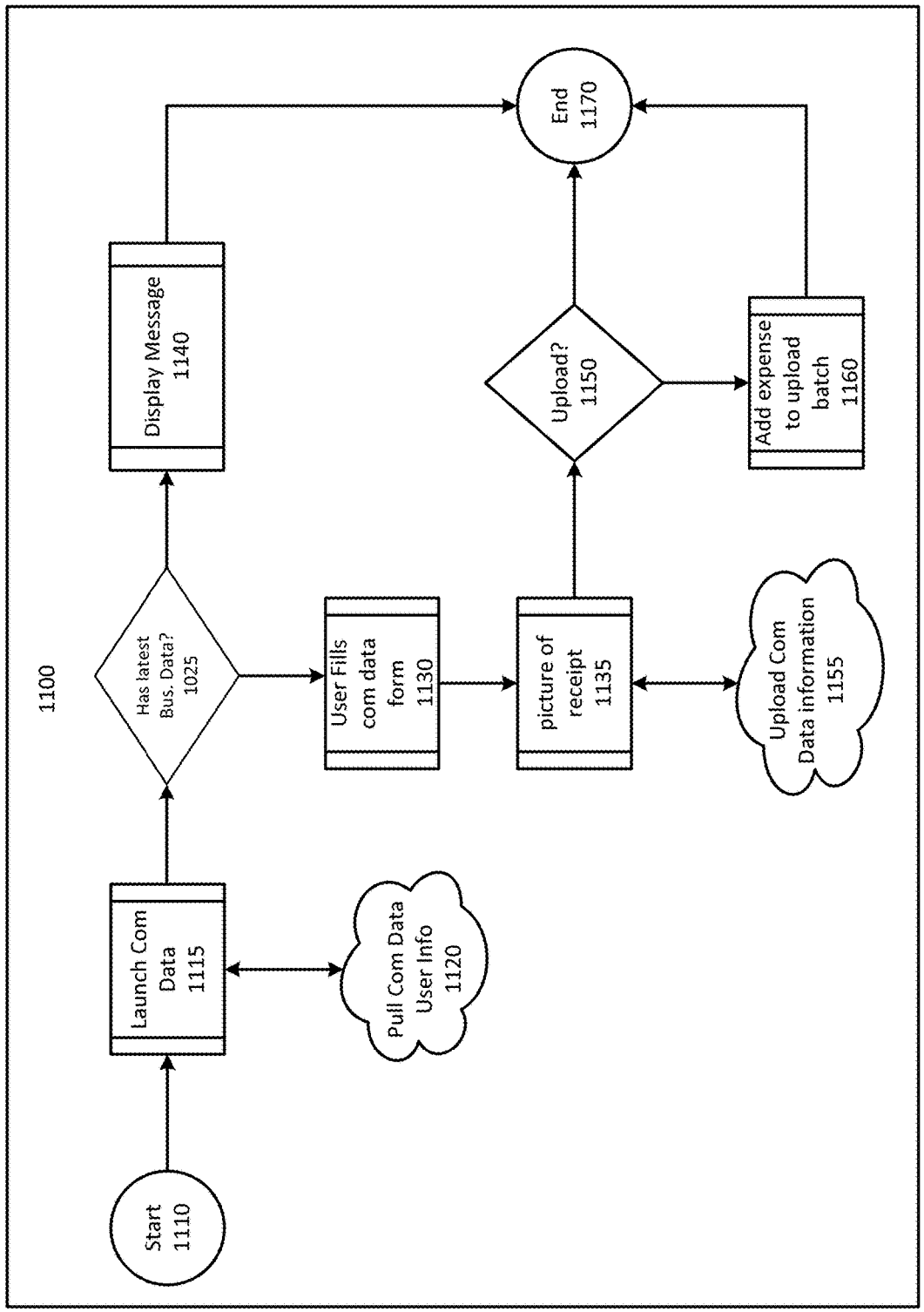
FIG. 4 depicts a series of steps 1100 related to a communications data procedure for the mobile application according to one embodiment of the present invention.

FIG. 4 shows a flow diagram decision tree for steps related to the communications data procedure of the communication data module 1100. Module 1100 within the application is structured and arranged to streamline data retrieval of expenses from credit card transactions.

Within the process set forth, it is typically the responsibility of company employees to provide photographic and financial logging of expenses performed with their credit cards. In an effort to simplify the process, this module provides the ability to submit an expense directly to a Keystyle application (which is part of a Viewpoint ecosystem). An added feature is that this module extends the functionality and usability of the Keystyle application thus extending the functionality of the Viewpoint ecosystem.

The communications data module 1100 includes an algorithm. The algorithm includes start 1110 where the user launches the communication data application 1115. Communication data information is returned 1120 to determine whether the user has a valid communication data profile 1125. If the user does not have an updated communication data profile the user is notified and module 1100 is launched 1140 to complete the process 1145. If the user has an updated communication data profile the user can complete a communication data form 1130, and optionally take a photo of an expense receipt 1135. The photo can be uploaded 1150 to complete the process 1165 or add the expense 1160 to a batch and then end the process 1170. Once complete, the application includes an automatic process that will attempt to reconcile the expense our users have entered to match the transactions which we have received from module 1100. The entire communication data profile can be uploaded 1155 to servers for storage.

Module 1100 includes various algorithms including an internal expense tracking controller which is responsible for the module 1100 related communication. This function class establishes a connection to a Keystyle database and performs the necessary data communication as defined by pre-determined business rules.

Various steps in determining expense types with a Get UD Expense Type function which is a query to a Vista database to pull the applicable expense types for expenses to be coded to. A Get Keystyle User KeyID function collects the user key ID from the Keystyle database for the user that invoked the call. A Get Keystyle Authentication Token function is a step that includes, based on the information based into the function, a call to be made to the Keystyle database to create an authentication token for Keystyle related operations.

A Create Expense Model function includes, based on a model that was passed into this endpoint, data that is formatted to conform to the parameters which the core Keystyle software requires to create an expense. This includes the expense creation as well as image attachment creation.

Figure 5:
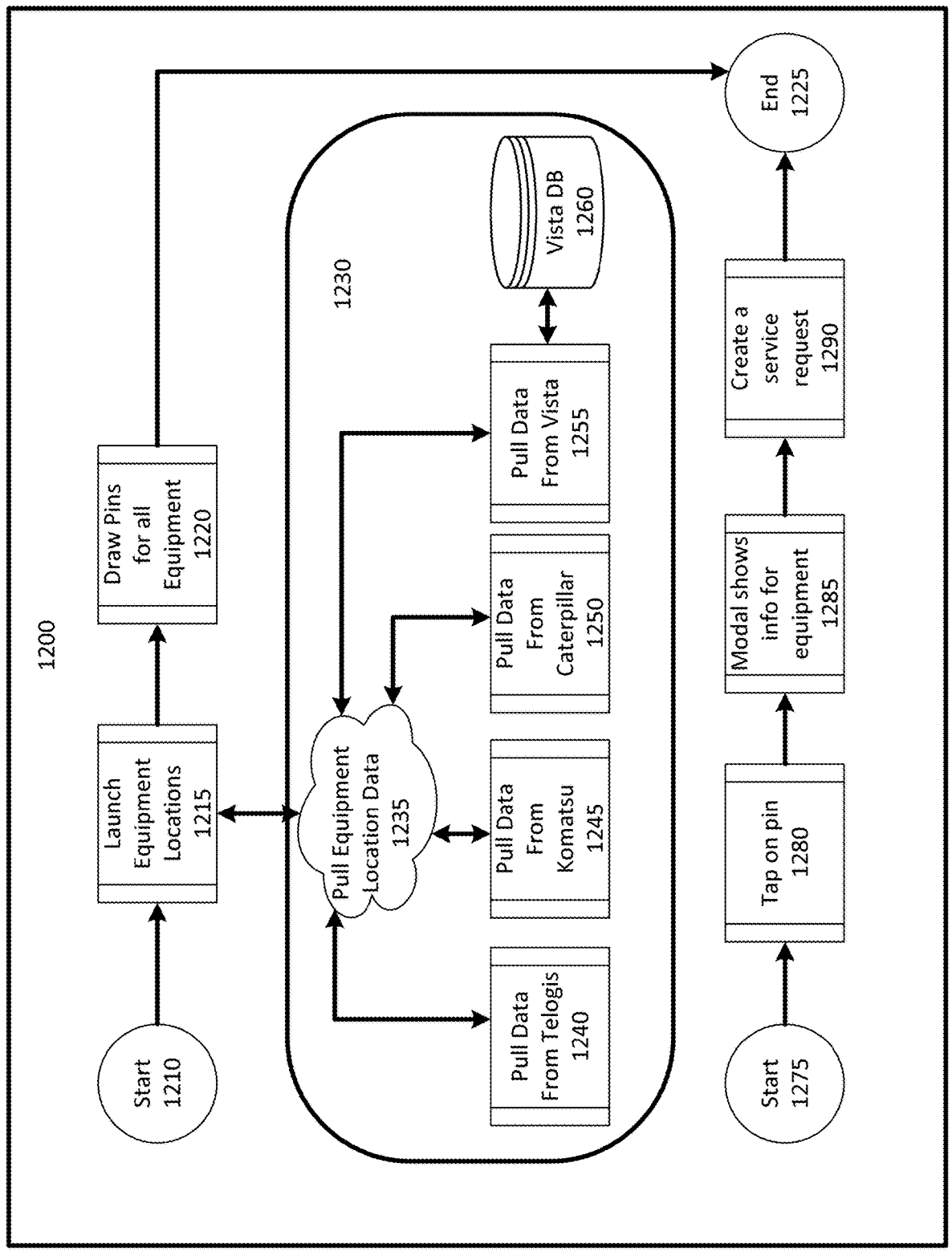
FIG. 5 depicts a series of steps 1200 related to an equipment location procedure for the mobile application according to one embodiment of the present invention.

FIG. 5 shows a flow diagram decision tree for steps 1200 related to the equipment location procedure of the Equipment Locations Module 1200.

The Equipment Locations Module 1200 enables (1210, 1275) the user to see, in real time 1280, the geographic location of all equipment 1285. This data is an aggregation 1220 from providers including but not limited to Verizon Telogis, Komatsu, Caterpillar and Vista. The user will then be able to create a service request 1290 for that piece of equipment with our back office.

Equipment Locations Module 1200 includes an algorithm function internal machine locations controller responsible for the aggregation and collection of equipment data across various third-party providers. This controller is structured and arranged to aggregate information from third party databases such as Verizon Telogis, Komatsu, Caterpillar and Vista. This data is merged and cached in memory in databases 294 and 295. The data is refreshed according to the time which is stored in the environment configuration file. Preferably the data is refreshed every 20 seconds though it will be understood that other times and frequencies are equally acceptable.

Equipment Locations Module 1200 also includes a Get All Vehicles function 1230 to return all cached data to the caller. There is a Get Komatsu Machines function 1245 that collects all of the machines in the Komatsu environment into the local databases. A Get Caterpillar Assets function 1250 collects all of the machines in the Caterpillar environment into the local databases. A Get Caterpillar Fleet Summary function collects a summary of the Caterpillar assets.

A Get Telogis Authorization Token 1240 function generates an authorization token to be used when interfacing with Verizon Telogis. A Get All Telogis Vehicle Locations function collects all Telogis equipment locations based on the last reported location from the installed GPS units.

The present invention also includes an internal Odometer Hosted Service that operates on 12 hours cycle or other configurable time schedule. The Odometer Hosted Service is responsible for aggregating real time engine and odometer data from the vehicles with the Telogis GPS units installed. This data is then fed into another process of ours that updates a Vista database 1260 with real-world values. This alleviates the need for a fleet management team to utilize time outreaching to operators to manually collect this information.

Equipment Locations Module 1200 also includes a Get Engine Odometer Readings function that aggregates the Odometer readings delivered by the REST call to Telogis. Once the data is retrieved, as long as data exists, the currently persisted values are truncated, and the newly retrieved values are persisted in their place. There is also a Get Odometer Values From Telogis which invokes a call to Telogis to collect odometer values for the equipment that contain the Telogis GPS units. There is also a Get Telogis Authentication Token function that generates an authentication token for communication with Telogis.

Figure 6:
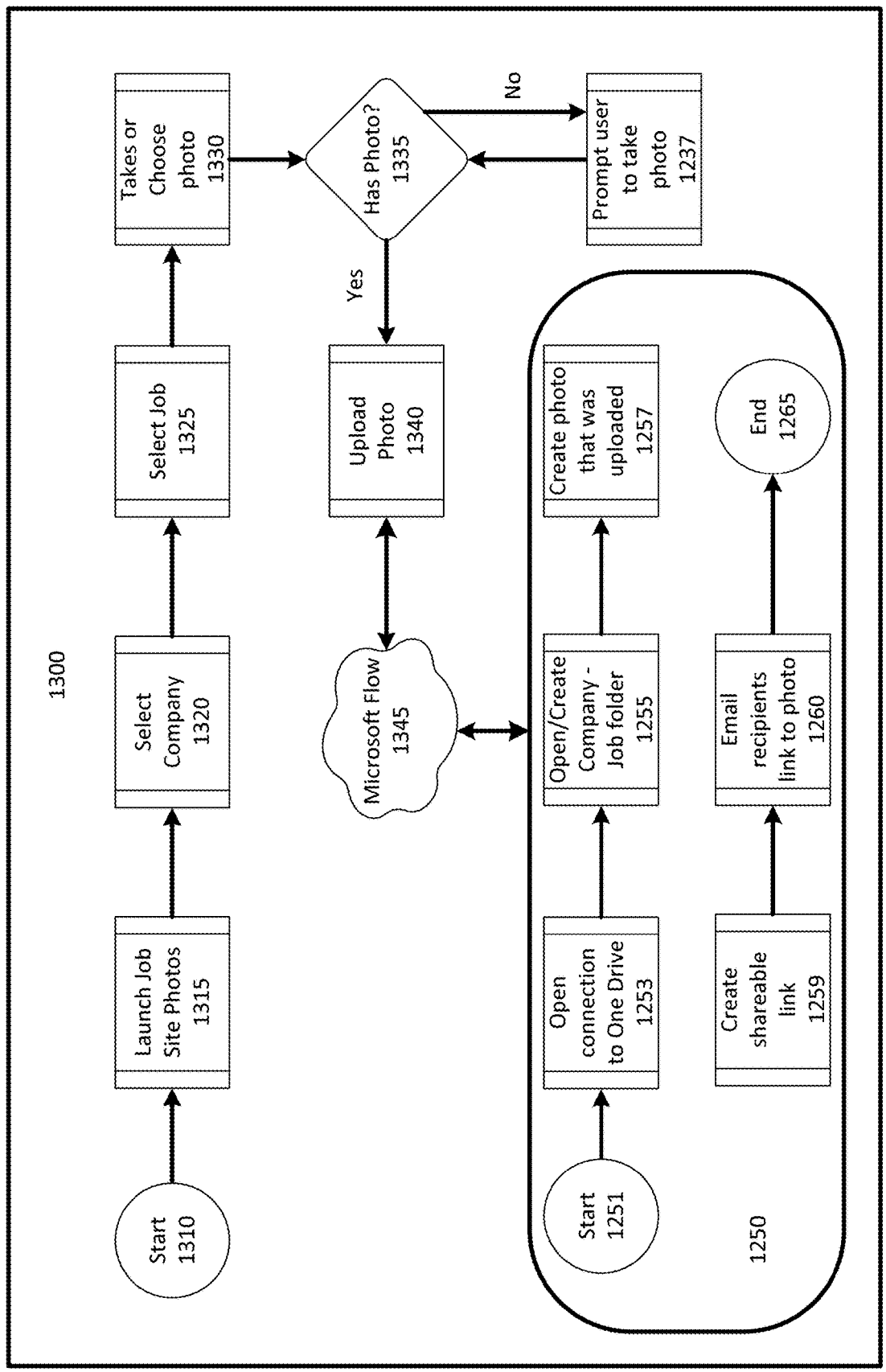
FIG. 6 depicts a series of steps 1300 related to a job site data procedure for the mobile application according to one embodiment of the present invention.

FIG. 6 shows a flow diagram decision tree for steps 1300 related to the job site photo procedure of the Job Site Photo Module 1200.

The Job Site Photos Module 1300 allows 1310 users to take photos on a job site to provide marketing material for our internal marketing and PR department. Photos taken 1330 by employees are stored in OneDrive and a link is sent to a recipient list so they may reference the photos as needed. By having this module in place, this provides a plethora of marketing material for our team to make use of that was otherwise unobtainable.

Job Site Photos Module 1300 includes an algorithm where a user starts the application 1310 to launch the Job site photos application 1315 and the user can select a company 1320 provided in a list, which then allows a sub menu of jobs to be selected 1325. The user can either take a photo 1330 after a prompt 1237 or select one 1335 as uploaded 1340 via Microsoft flow process 1345. Process 1345 includes a sub routine 1250 at start 1251 there is a connection opened to OneDrive 1253, an open company job folder function 1255 in order to create a photo that may have been captured 1257. There can be shareable link created 1259 for the photo which can be emailed to pre-determined recipients 1260 to complete the process 1265.

Job Site Photos Module 1300 includes an algorithm with an internal Viewpoint Controller function that handles transmission and alteration of data to and from the Vista database. This handles core business definitions such as Companies, Jobs, Phases, etc. Security is handled on a row level by leveraging Vista's built in security model. Only data the logged in user is provisioned to view will be returned. There is a Get Company List function that collects a list of companies that exist in Vista. A Get Jobs function collects a list of jobs that exist in Vista. A Get Jobs For Company function collects only the jobs for the provided company.

There is a Get Phases function that collects a list of phases that exist in Vista and a Get Phases For Job function that then collects only the phases for the provided job.

There is a Get JCCT List for collecting all of the contract items and a Get Craft Classes function that collects all of the craft and classes as they exist in Vista.

Job Site Photos Module 1300 also includes a Get Employees function that collects all of the employee information that is relevant to the calling application as they exist in Vista.

More specifically there a Get Employees For Company function that collects employee information that is relevant to the calling application as they exist in Vista for the provided company.

A Get Equipment function collects all of the equipment information that is relevant to the calling application as they exist in Vista. A Get Equipment For Job function collects equipment information that is relevant to the calling application as they exist in Vista for the provided job.

There is a Get Employee For Email function that collects employee information for a provided email address and Get Current Employee function that collects employee information for the currently logged in user as they exist in Vista.

There is also a Get GL Accounts function that collects relevant GL Account information from Vista and a Get Show Up Yards function that collects the show up yards as they exist in Vista.

Figure 7:
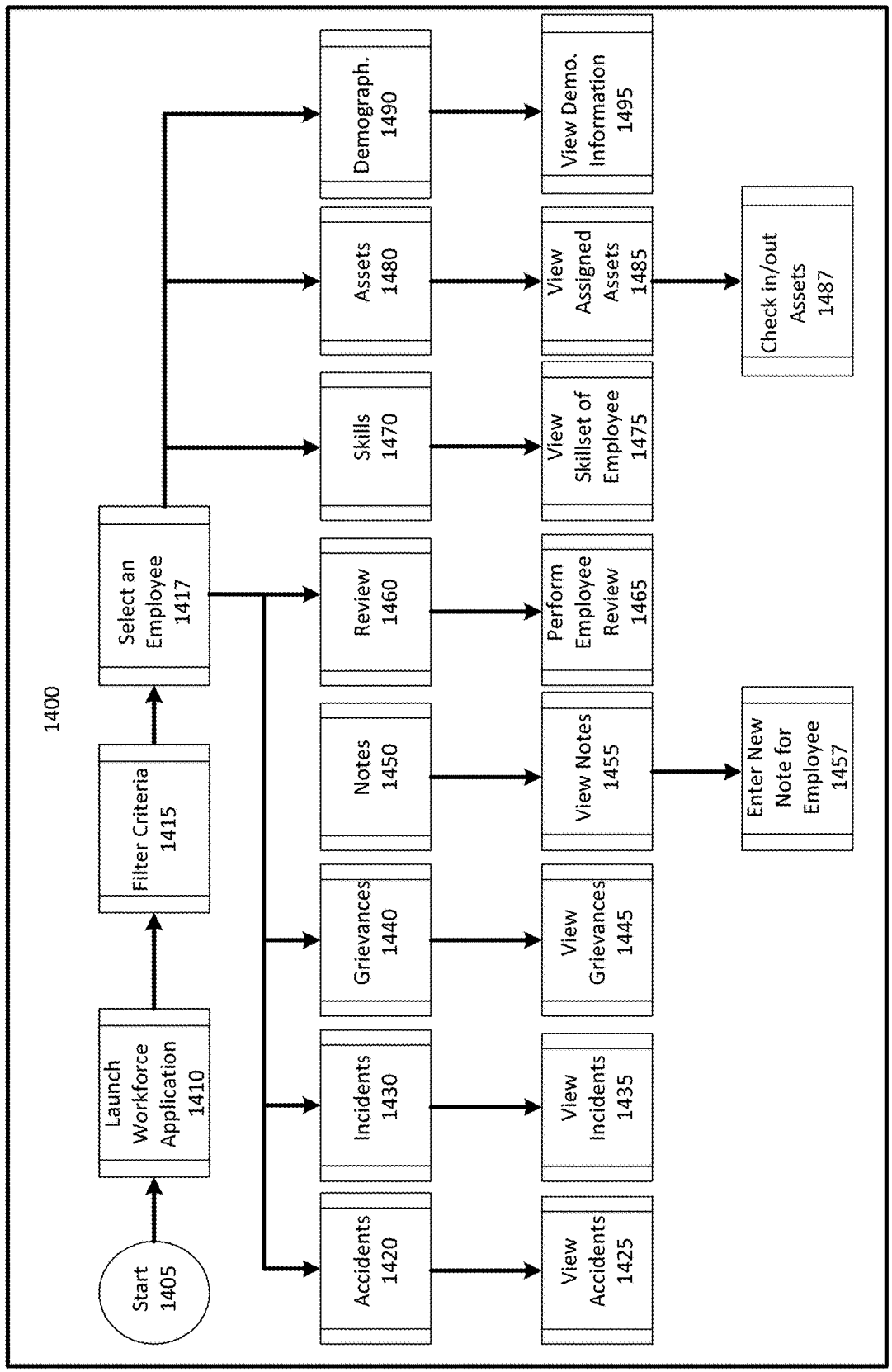
FIG. 7 depicts a series of steps 1400 related to a workforce management operation for the mobile application according to one embodiment of the present invention.

Referring now to FIG. 7 which shows a flow diagram decision tree for steps 1400 related to the work force management operation of the Work Force Module 1400. Depending on the size of the workforce business requirements this module may require its own controller functions.

Work Force Module 1400 is structured and arranged to allow users to complete business-related employee tasks. These tasks range from retrieving information regarding a specific employee to conducting employee reviews. Originally, if an employee review were to be completed, it would have to be done by logging into Vista on a PC and having that PC on our domain via on site or through VPN. However, the present invention allows managers to perform reviews, make comments, add notes and manage assets from the field.

Work Force Module 1400 includes an algorithm having an internal workforce controller that is responsible for the retrieval, modification and insertion of workforce related information.

The algorithm includes a Get Employee Details function that collects the details of an employee that was specified. There is also a Get Accident Information function that collects all of the HR Accident information for the specified employee. A Get Grievance Information function collects all of the HR Grievances for the specified employee, a Get Employee Notes function collects HR notes for the specified employee and an Update Employee Notes function updates HR notes of an employee with the specified notes. This will append the notes to the existing notes in HR for that employee.

There is also a Get Asset Information function that collects asset information regarding all of the assets which the employee currently has under his/her name. A Get Filtered Employees function collects a list of employees which meet the filtered requirements.

There also is included an internal Engine Times Hosted Service function which is based on current business requirements, where engine times from Verizon Telogis are collected and stored in a databased store approximately every 3 hours. It will be understood that other times and frequencies may be sufficient for the purposes of the present invention. The Engine Times Hosted Service runs on a timed interval to refresh the data. This data is then used in various business reports.

There is included a Get Engine Times function that utilizes engine times that are delivered from 'Get Engine Timing' function and inserts them into a persistent cached data store.

The Get Engine Timing function initials the request to collect engine times from Telogis based on a timed window (start time and end time). There is a Get Telogis Authentication Token function that generates an authorization token to be used to communicate with Verizon Telogis.

The algorithm includes an internal Expenses Maintenance Hosted Service function which, for the Communications Data module, is utilized to perform various tasks on the data. This hosted service performs a data reconciliation that runs every 24 hours. It will be understood that other times and frequencies may be sufficient for the purposes of the present invention.

There is an Automated Expenses Maintenance function that collects data from the Keystyle database and matches and submits expenses as they relate to transactions processed by the Communications Data Module.

The algorithm includes an internal Auditor Hosted Service applicable in a safety module to perform safety inspections and daily job briefs in the field. This hosted service will collect pertinent information from the Vista database and process the data to an auditor database ecosystem. This allows for dynamic lookup values as they exist in the Vista database.

There is included an Update Companies function that maintains a company list in the auditor database ecosystem that collects the list of companies from Vista database and processes the data to additional pre-determined database locations.

There is also an Update Employees functions that maintains an employee list currently in auditor database ecosystem which collects the employee list from the Vista database and processes the data to additional pre-determined database locations.

There is also an Update Jobs functions that maintains jobs list currently in auditor database ecosystem which collects the jobs list from the Vista database and processes the data to additional pre-determined database locations.

There is also an Update FEMA Jobs functions that maintains a FEMA Jobs list currently in auditor database ecosystem which collects the FEMA Jobs list from the Vista database and processes the data to additional pre-determined database locations.

The algorithm includes an internal Machine Locations Hosted Service which is responsible for maintaining the locations of machines in memory for rapid retrieval. This service runs on a timed basis every 20 seconds. It will be understood that other times and frequencies may be sufficient for the purposes of the present invention.

There is a Get Machine Locations function that collects a list of equipment locations from Komatsu and Caterpillar. Once data is retrieved, it is added to the internal cache along with the Telogis machine locations.

This includes a Get Telogis Machines function to collect the list of equipment locations from Telogis and a Get Telogis Authentication Token function that generates an authentication token in order to communicate with Verizon Telogis.

The algorithm includes an internal Outlook PTO Calendar Updater Hosted Service, which in a transparent environment, interfaces with Keystyle database to collect PTO information and merge into multiple departmental shared calendars in Outlook. This system will fully manage the creation, alteration and deletion of events to keep departmental and company calendars in sync.

There is an Update Shared PTO Calendars By Department function that updates Outlook calendars by department and retrieves events from the Keystyle database and compares those events against events that already exist in the shared calendar in Outlook.

There is also a Perform Crude Operations For Department Calendars function that Handles the Create, Read, Update, and Delete operations on a departmental level and Get Events Grouped By Department Mailbox function that collects the events per department to be used by other internal functions.

There is a Perform Crud Operations For Company Calendars function that manages the Create, Read, Update, and Delete operations on a Company level and a Perform Crude Operations For Employee Calendars function that manages the Create, Read, Update, and Delete operations on an Employee level.

A Perform Crud Operations function manages the Create, Read, Update, and Delete operations as a whole.

There is also a Scrub Calendar For Events Without Key IDs function that manages the removal of any events that may have been created outside of this environment and Perform Crud Operations For Company Holidays function that manages the Create, Read, Update, and Delete operations on a Company Holiday level.

Figure 8:
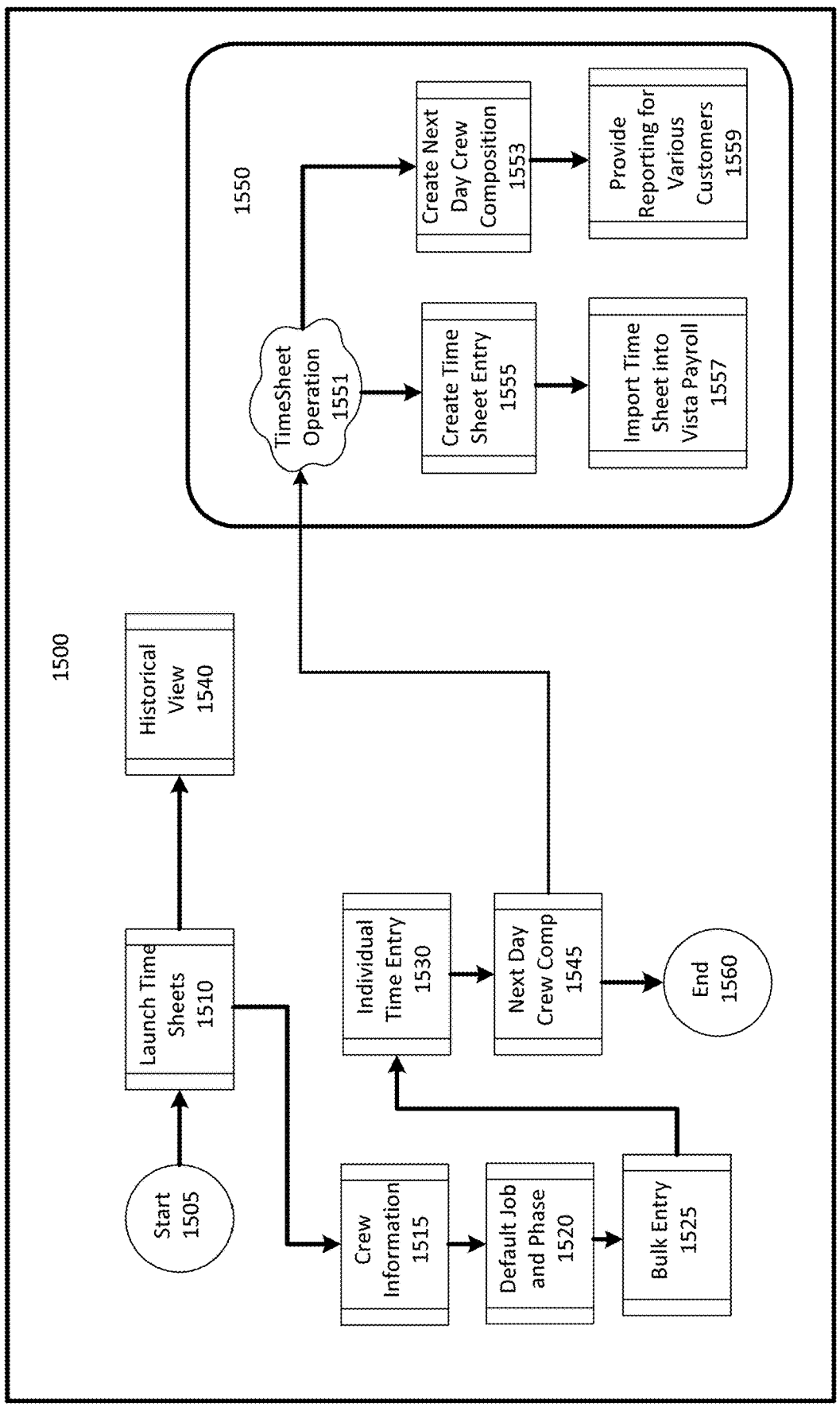
FIG. 8 depicts a series of steps 1500 related to an employee time sheet management system for the mobile application according to one embodiment of the present invention.

Referring now to FIG. 8 which shows a flow diagram decision tree for steps 1500 related to the time sheet management system of the Timesheets Module 1500.

The Timesheets Module 1500 includes algorithms structured and arranged for controlling the Time Entry process within an organization. By having time entry performed through the application, management is able to gather timesheets directly from the end users without having physical paper timesheets passed from one employee to another for data entry occurring more than once. With this application, users are able to enter time sheet data for their crew directly. Having the user enter their own time sheets digitally further allows us to automate other business use cases for error checking and handling. This allows an organization to be more proactive than reactive.

The Timesheets Module 1500 includes an algorithm where a user starts 1505 and the module is launched 1510 with a comparison to an historical view 1540 of prior time sheet data. Crew information 1515 is provided regarding default job and phase 1520 with bulk entry of information 1525. The user can provide an individual time entry 1530 and provide next day crew composition 1545 to complete the process 1560.

The algorithm includes an internal Timesheets Controller 1550 with business logic functions to drive the Timesheets application. There is an Upload Timesheet Data function 1551 that, based on a pre-determined list of timesheets 1557, determines whether a specific timesheet 1555 should be created or updated. If the timesheet already exists, it will be updated otherwise it will be created.

There is a Create Timesheet function 1555 that, based on the submitted timesheet, creates records in an internal database for the timesheet record. This includes creating entries for the employees, equipment, jobs, phases and crew 1553. There is an Update Timesheet function 1559 that, processing the timesheet, the timesheet ID will be aggregated in order to update the required tables in the database.

There is an Update Timesheets Production function that updates the production (quantity of work completed) for the associated phases in the timesheet. There is also an Update Timesheets Jobs function, an Update Timesheets Employees functions and an Update Timesheets Equipment functions that updates fields, values for the employee and the associated equipment in the Jobs section of the timesheet object.

It should be understood that references to "the application 10" may also be referring to a plurality of applications. For example, certain embodiments or functionalities described hereinabove performed by "the application 10" may actually be broken up and performed by a plurality of separately downloadable, or separately running, programs or applications. It should be understood that, in the event that "the application 10" includes a plurality of applications, these separate applications may all be connected to perform the functionalities and perform the methods described herein.

Figure 9:
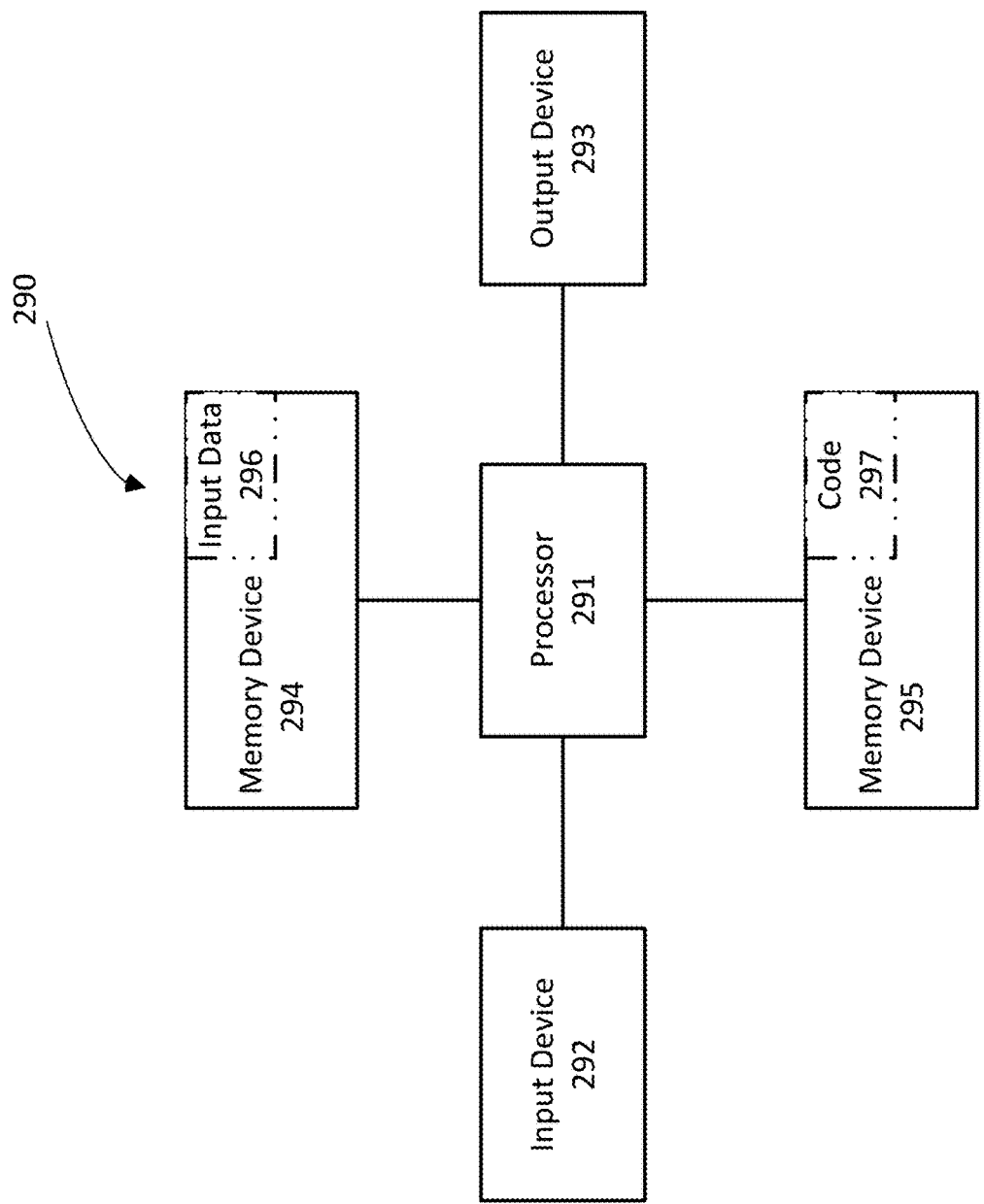
FIG. 9 depicts a computer system in accordance with one embodiment of the present invention.

Referring now to FIG. 9 which illustrates a computer apparatus structure 290 used by the application 10 described hereinabove for performing the disclosed methods including the algorithms described herein and various other applications in accordance with embodiments of the present invention. The computer system 290 includes a processor 291, an input device 292 coupled to the processor 291, an output device 293 coupled to the processor 291, and memory devices 294 and 295 each coupled to the processor 291. The input device 292 may be, inter alia, a keyboard, a mouse, a camera, a touchscreen, etc. The output device 293 may be, inter alia, a printer, a plotter, a computer screen, a magnetic tape, a removable hard disk, a floppy disk, etc. The memory devices 294 and 295 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 295 includes a computer code 297. The computer code 297 includes algorithms (e.g., the algorithms of FIGS. 2-8) for providing a means for performing the methods and applications described herein. The processor 291 executes the computer code 297. The memory device 294 includes input data 296. The input data 296 includes input required by the computer code 297. The output device 293 displays output from the computer code 297. Either or both memory devices 294 and 295 (or one or more additional memory devices not shown in FIG. 9) may include the algorithms described hereinabove and may be used as a computer usable medium (or a computer readable medium or a program storage device) having a computer readable program code embodied therein and/or having other data stored therein, wherein the computer readable program code includes the computer code 297. Generally, a computer program product (or, alternatively, an article of manufacture) of the computer system 290 may include the computer usable medium (or the program storage device).

Still yet, any of the components of the present invention could be created, integrated, hosted, maintained, deployed, managed, serviced, etc. by a service supplier who offers to provide a means for performing the methods and applications described herein. Thus, the present invention discloses a process for deploying, creating, hosting, maintaining, and/or integrating computing infrastructure, including integrating computer-readable code into the computer system 290, wherein the code in combination with the computer system 290 is capable of performing the methods and applications described herein. In another embodiment, the invention provides a business method that performs the process steps of the invention on a subscription, advertising, and/or fee basis. That is, a service supplier, such as a Solution Integrator, could offer to provide the methods and applications described herein. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 9 shows a representative computer system 290 as a particular configuration of hardware and software, any configuration of hardware and software, as would be known to a person of ordinary skill in the art, may be utilized for the purposes stated supra in conjunction with the particular computer system 290. For example, the memory devices 294 and 295 may be portions of a single memory device rather than separate memory devices.

Figure 10:
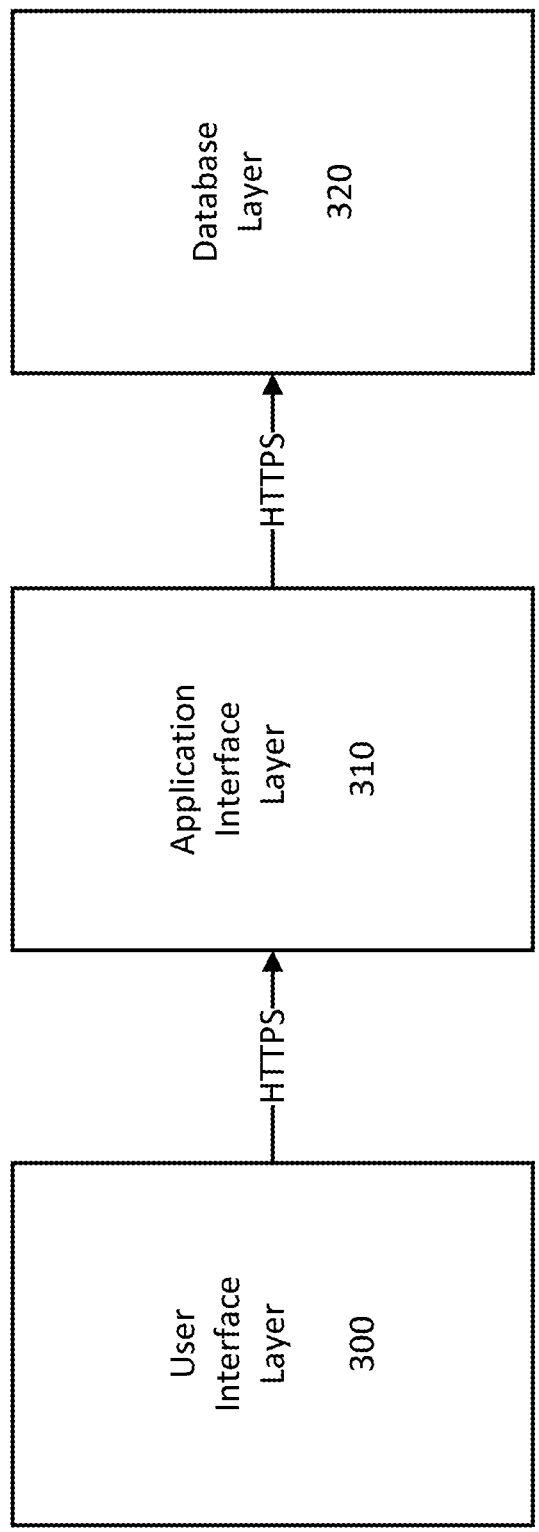
FIG. 10 depicts a computing environment in which resides one embodiment of the invention.

Referring now to FIG. 10 which shows a computing environment in which algorithms as described in reference to FIGS. 3-8 have been developed and maintained. In a User Interface Layer 300 portions of the described algorithms have been programmed using React Native® or other similar programming. In Application Interface Layers 310 some of the described algorithms have been programmed using C Sharp NetCore® or other API programming code. In Database Layer 320 data has been coded using Microsoft Sequel Server®. Each of layers 300, 310 and 320 communicate via protocols customary to HTTPS.

Communication protocols on the server-side may reside on and may be executed by server level computers, which may be in communication with each of the elements listed in this specification via network connection (e.g., the Internet or a local area network). Examples of a server computer may include, but are not limited to: a personal computer, a server computer, a series of server computers, a mini computer, and/or a mainframe computer. The server computer may be a distributed system and the operations of server computer may execute on one or more processors, simultaneously and/or serially. For example, a server computer may be a symbolic representation of a cloud computing site, cloud environment, or cloud platform running multiple servers, computers, or virtual machines. A server computer may execute one or more operating systems, examples of which may include but are not limited to: Microsoft Windows Server™; Novell Netware™; Redhat Linux™, Unix, or a custom operating system, for example.

For example, a server computer may be a symbolic representation of a cloud-based automated checkout system, cloud-based package tracking system, or server suitable for performing the operations described in the present disclosure. In an implementation, a server computer may be a cloud-based automated real time updating database system and/or cloud-based data tracking system or server which may include, store, run, and/or execute automated processes and/or software programs or algorithms as described herein. A cloud-based automated system and/or cloud-based data tracking system, or server may be part of a network of servers and other computing devices administered by a company or business that uses automated processes and/or data tracking processes, such as a telecommunications company or database retailer or physical store selling services to customers.

There are instruction sets and subroutines of a server-side automated data process and/or data tracking process, which may be stored on a storage database device coupled to a server computer, which instruction sets and subroutines may be executed by one or more processors and one or more memory architectures incorporated into a server computer or a series of server computers. Storage devices may include but are not limited to: a hard disk drive; a tape drive; an optical drive; a solid state storage device; a RAID array; a random access memory (RAM); and a read-only memory (ROM).

Server computer(s) may execute a web server application that allows for access to the server computer (via a telecommunication or wife network) using one or more protocols, examples of which may include but are not limited to HTTPS (i.e., Secure HyperText Transfer Protocol). Networks may be in communication with one or more secondary networks, examples of which may include but are not limited to: a local area network; a wide area network; or an intranet, for example.

Client-side or user automated data processes and/or client-side or user data tracking processes may reside on and may be executed by client (user) electronic devices, examples of which may include but are not limited to personal computer, a television with one or more processors embedded therein or coupled thereto, a laptop computer, a data-enabled mobile telephone or smartphone, notebook computer, a tablet, and a personal digital assistant, for example. Client electronic devices may each be in communication with a network and may each execute an operating system, examples of which may include but are not limited to Apple iOS™, Microsoft Windows™, Android™, Redhat Linux™, or a custom operating system.

In an implementation, one or more of client electronic devices may be associated with an associate, employee, or customer of the company or business that uses one or more of the automated data process and/or data tracking processes. For example, a data-enabled mobile telephone may be a mobile device such as a smartphone associated with the associate, employee, or customer.

The instruction sets and subroutines of client-side automated data processes and/or client-side data tracking processes may be stored on storage devices coupled to client electronic devices, which instruction sets and subroutines may be executed by one or more processors and one or more memory architectures incorporated into client electronic devices. Storage devices may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side automated data processes and/or server-side automated data processes may be processes that run within (i.e., are part of) a cloud computing site, cloud computing application, cloud platform, or cloud environment. Alternatively, client-side automated data processes and/or server-side automated data process may be stand-alone applications that work in conjunction with the cloud computing site, cloud computing application, cloud platform, or cloud environment. One or more of client-side automated data processes and server-side automated data processes may interface with each other (via the telecommunications network or WIFI network). Further, client-side data tracking processes and/or server-side data tracking processes may be processes that run within (i.e., are part of) a cloud computing site, cloud computing application, cloud platform, or cloud environment. Alternatively, client-side data tracking processes and/or server-side data tracking process may be stand-alone applications that work in conjunction with the cloud computing site, cloud computing application, cloud platform, or cloud environment. One or more of client-side data tracking processes and/or server-side data tracking process may interface with each other (via telecommunications networks and/or WIFI network).

Users may access server-side automated data process and/or server-side data tracking processes directly through the device on which the client-side automated data process or client-side data tracking processes are executed, namely client electronic devices, for example. Users may access server-side automated data processes and/or server-side data tracking processes directly through telecommunications networks and/or through secondary networks. Further, a server computer (i.e., the computer that executes server-side automated data process and/or server-side data tracking process) may be in communication with the telecommunications network through a secondary network via a phantom link line.

The various client electronic devices may be directly or indirectly coupled to a telecommunications network or WIFI network. For example, a personal computer can be directly coupled to a telecommunications network via a hardwired network connection. Further, a notebook computer can be coupled to a network via a hardwired network connection. A laptop computer can be wirelessly coupled to a network via wireless communication channel established between laptop computer and wireless access point (i.e., WAP), which WAP coupled to a telecommunications network. A WAP may be, for example, an IEEE 802.11a, 802.11b, 802.11g, 802.11n, Wi-Fi, and/or Bluetooth device that is capable of establishing a wireless communication channel between a laptop computer and the WAP. A data-enabled mobile telephone can be wirelessly coupled to a network via wireless communication channel established between data-enabled mobile telephone and a cellular network/bridge, which can also be directly coupled to telecommunications network.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

Turning now to FIGS. 11-30, there are screen shots showing various GUI interfaces for the mobile application being implemented on a handheld mobile device according to one embodiment of the present invention.

Figure 11:
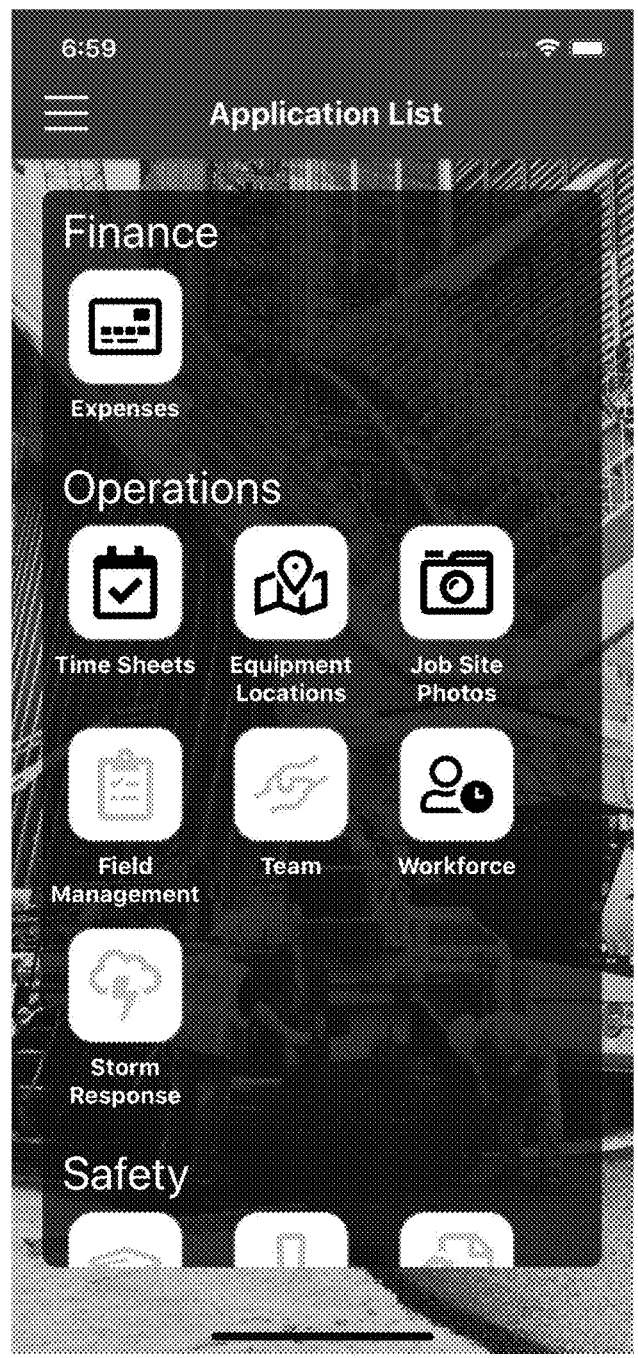
FIG. 11 depicts an application list interface of the mobile application in accordance with one embodiment of the present invention.

FIG. 11 shows an application list interface including a menu of icons representing the various functional applications embedded within the mobile application in accordance with one embodiment of the present invention. The application list as shown includes a Finance Module, and Operations Module and a Safety Module. Within each module there exists sub-modules such as within in the Finance module there is an Expenses module. Within the Operations Module there are multiple modules including Timesheets, Equipment Locations, Job Site Photos, Field Management, Team, Workforce and Storm Response. It is important to note that each module can and will include additional sub-modules as the present invention continues to be improved.

Figure 12:
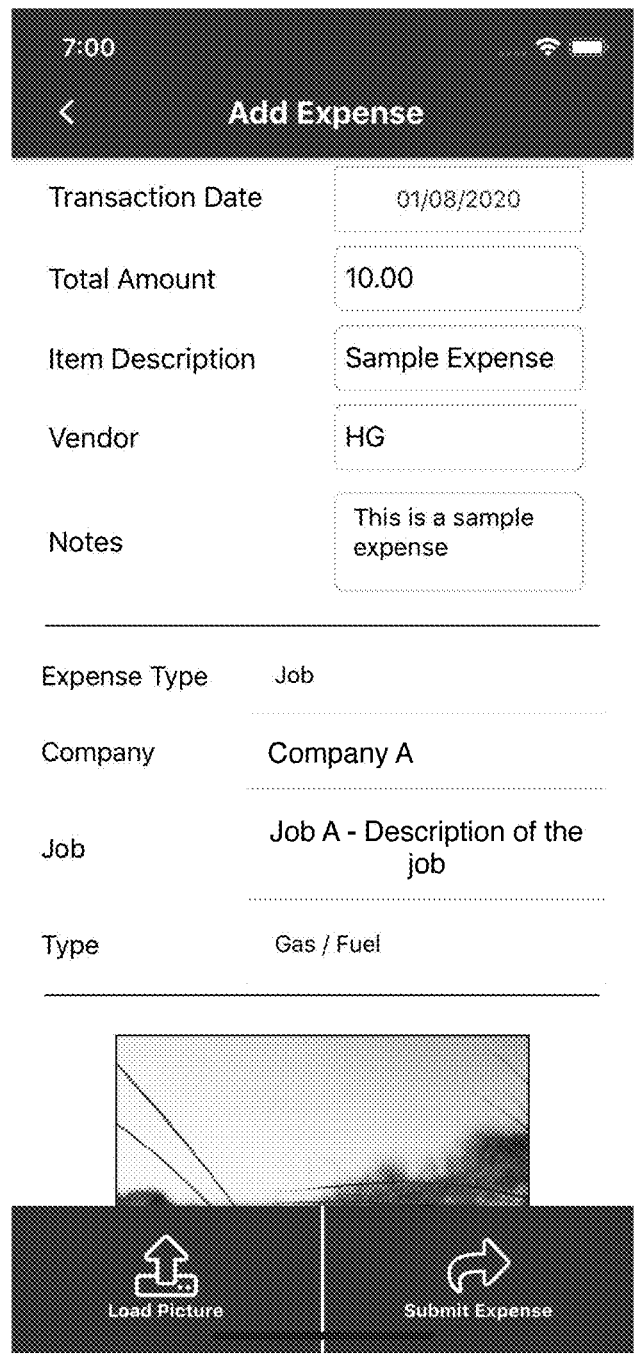
FIG. 12 depicts an expense entry interface within the Finance Module of the mobile application in accordance with one embodiment of the present invention.
Figure 13:
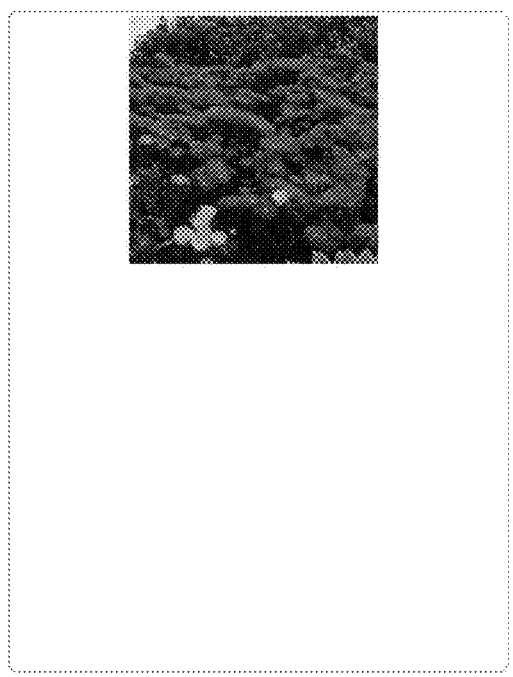
FIG. 13 depicts an entry interface within the Job Site Photo Module of the mobile application in accordance with one embodiment of the present invention.

FIG. 12 shows an expense entry interface within the Finance Module having user manipulative boxes for various user input of expense including a transaction date, total amount, item description vendor and notes. Also shown is the expense type, a company name, the job name and the type of expense. Also shown are functions to allow the user to upload a photo and submit the expense information of the mobile application in accordance with one embodiment of the present invention;

FIG. 13 shows an entry interface within the Job Site Photo's Module showing a picture upload and various location data associated therewith. There is also shown a load function and a submit function to be manipulated by the user.

Figure 14:
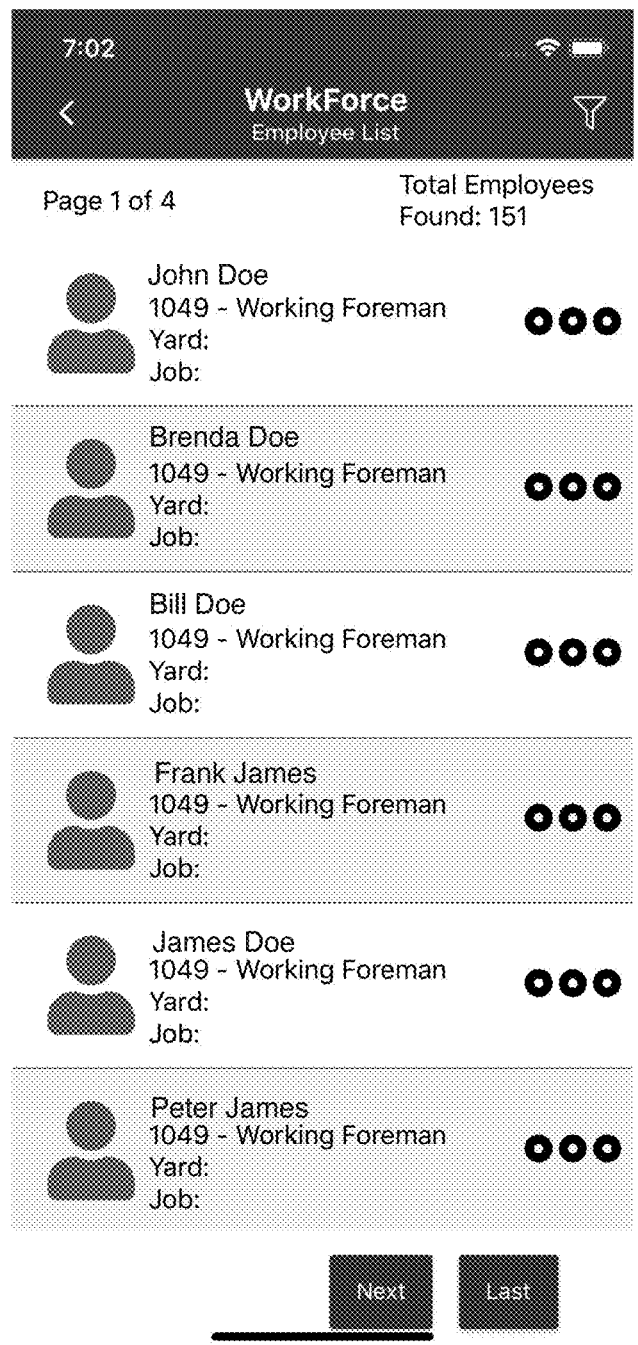
FIG. 14 depicts an employee list interface within the Workforce Module of the mobile application in accordance with one embodiment of the present invention.

FIG. 14 shows an employee list interface within the Workforce Module showing a list of works in the database along with associated employee data and a next function and last function.

Figure 15:
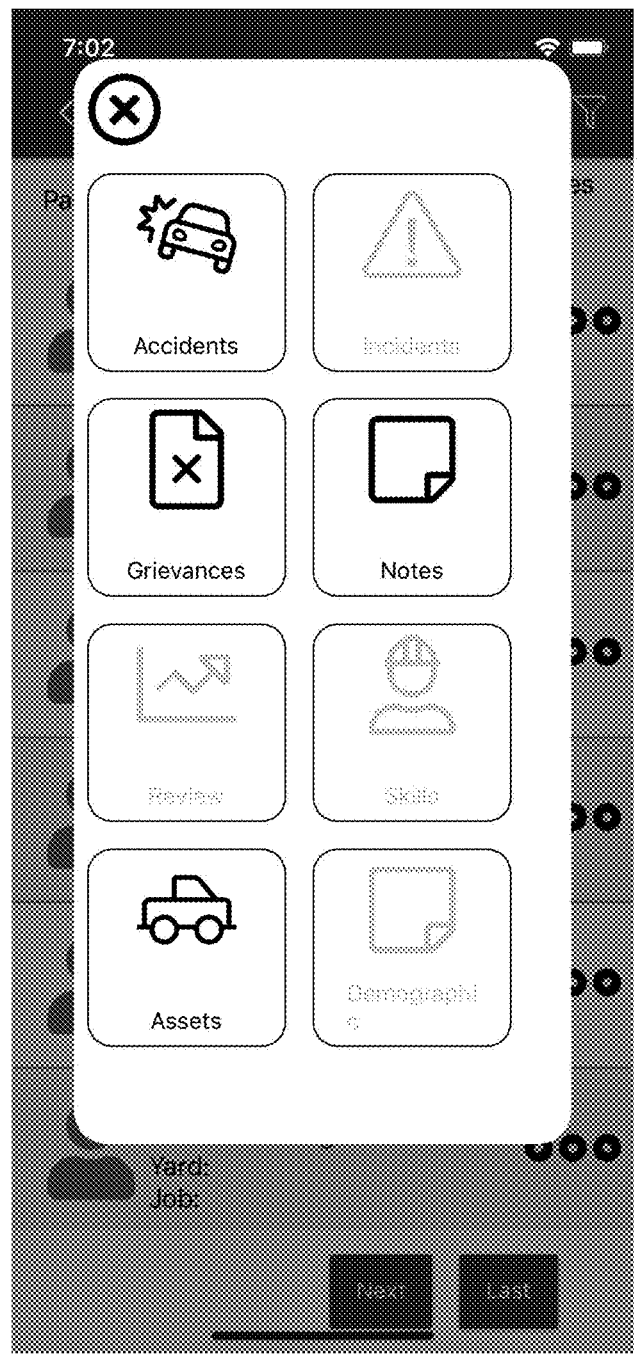
FIG. 15 depicts a sub-entry interface within in the Workforce Module of the mobile application in accordance with one embodiment of the present invention.

FIG. 15 shows a sub-entry interface within in the Workforce Module showing a menu listing user actions including function buttons for input of information related to accidents, incidents, grievance, notes, reviews, skills, assets and demographics.

Figure 16:
FIG. 16 depicts an accident interface within in the Workforce Module of the mobile application in accordance with one embodiment of the present invention.

FIG. 16 shows an accident interface within in the Workforce Module with associated date, reference number and employee information.

Figure 17:
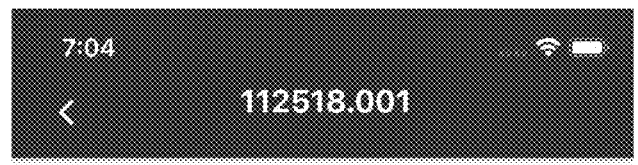
FIG. 17 depicts a sub-interface within in the Workforce Module of the mobile application in accordance with one embodiment of the present invention.

FIG. 17 shows a specific accident sub-interface within the Workforce Module showing the accident reference number, date, job, location supervisor and notes for user input prompts.

Figure 18:
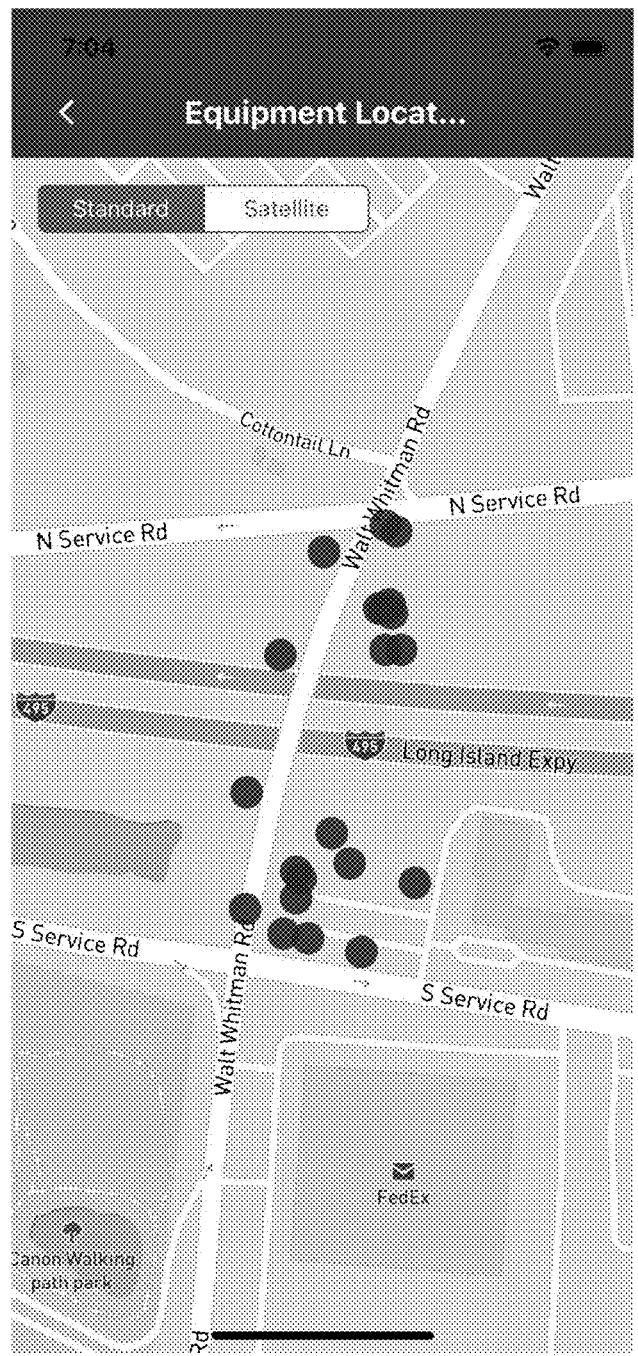
FIG. 18 depicts a map interface within the Equipment Location Module of the mobile application in accordance with one embodiment of the present invention.

FIG. 18 shows a map interface within the Equipment Location Module showing various locations of company assets as colored dots on a map. The map is generated by connecting to a GPS validated server communicating with a database hosing equipment location information.

Figure 19:
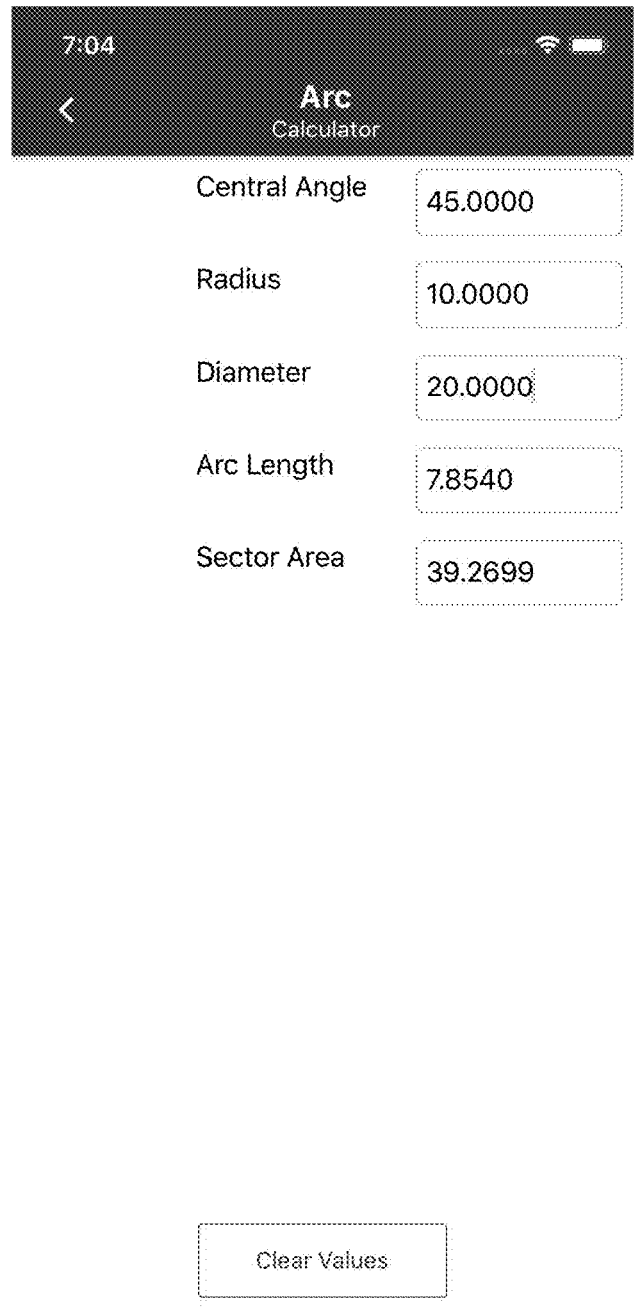
FIG. 19 depicts a calculator interface within the mobile application in accordance with one embodiment of the present invention.

FIG. 19 shows an ARC calculator interface showing input boxes mathematical requirements of determining ARC such as central angle, radius, diameter, arc length and a sector area. There is also a clear values function button.

Figure 20:
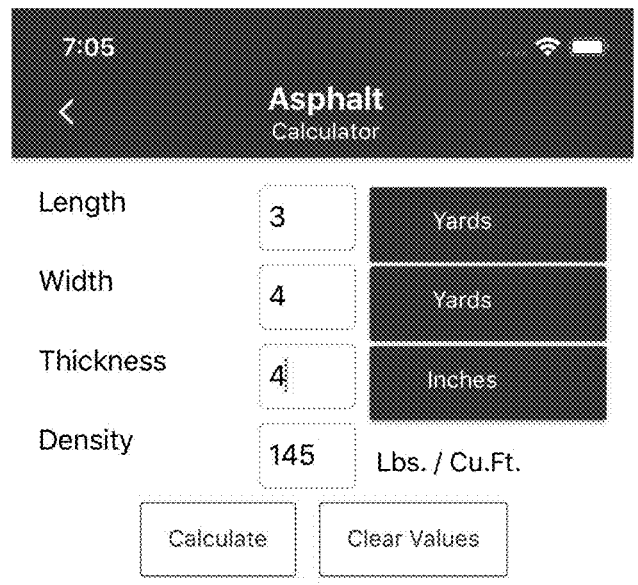
FIG. 20 depicts another calculator interface within the mobile application in accordance with one embodiment of the present invention.
Figure 21:
Figure 23:
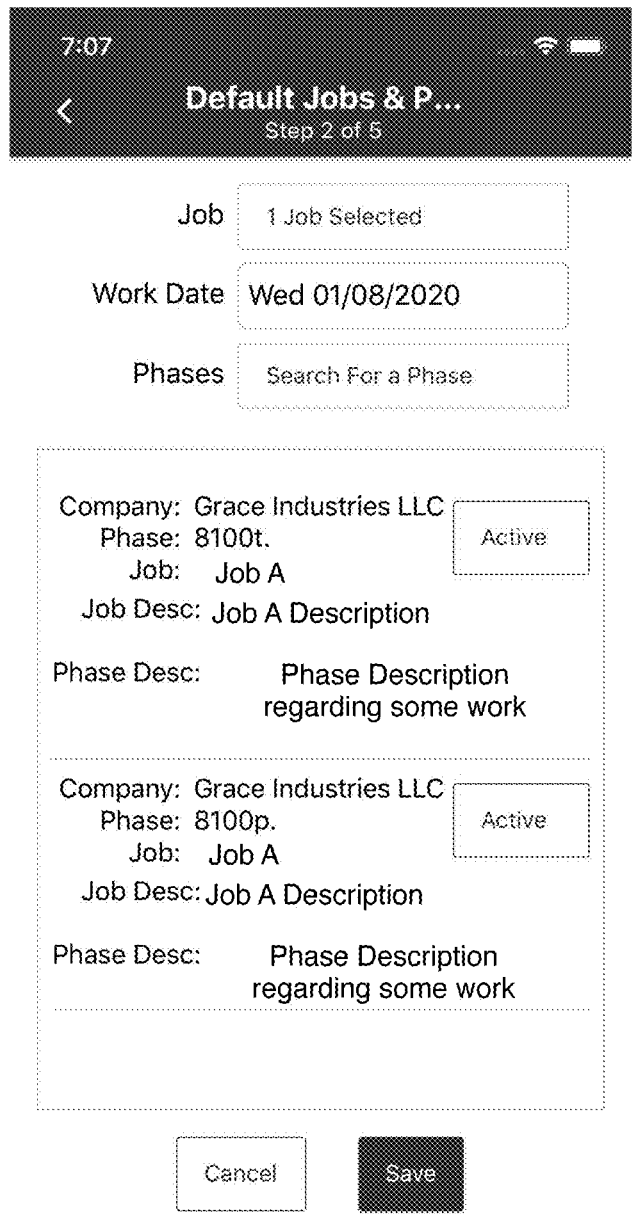
Figure 26:
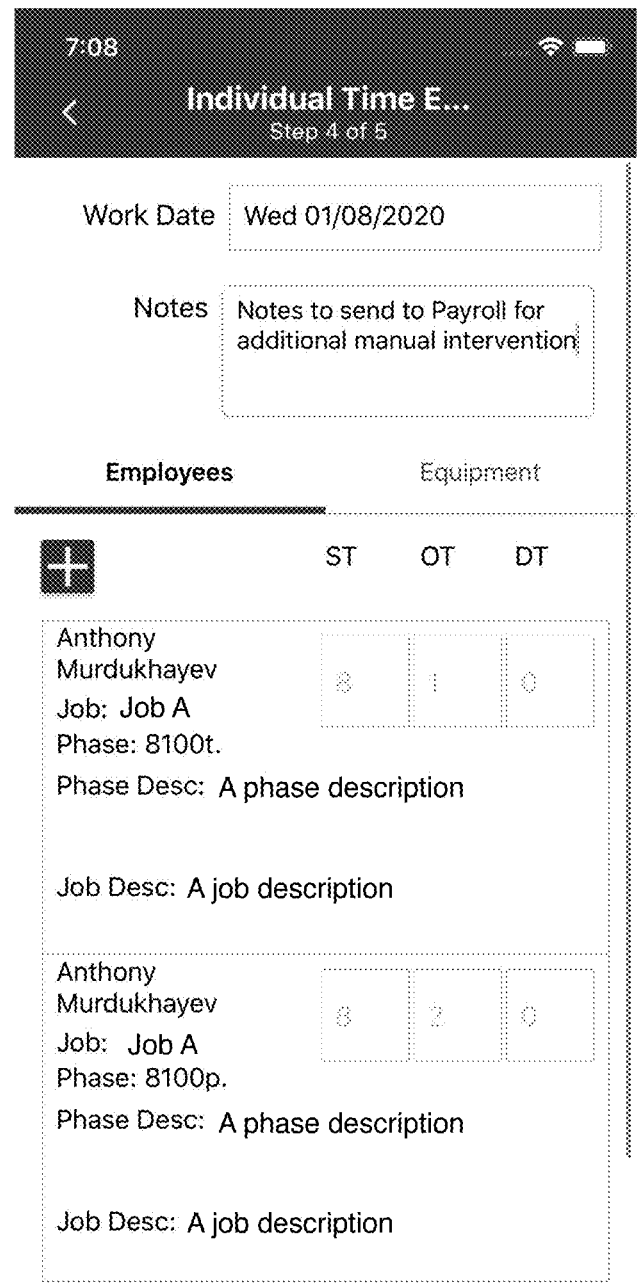
Figure 27:
Figure 28:
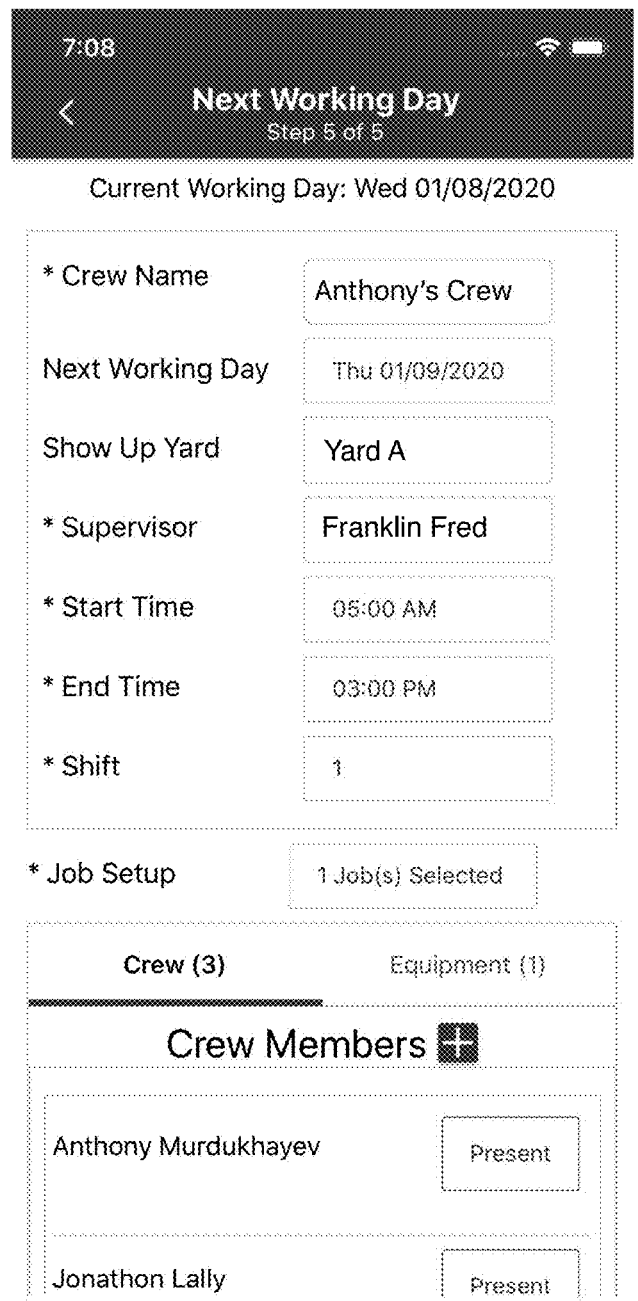
Figure 29:
Figure 30:
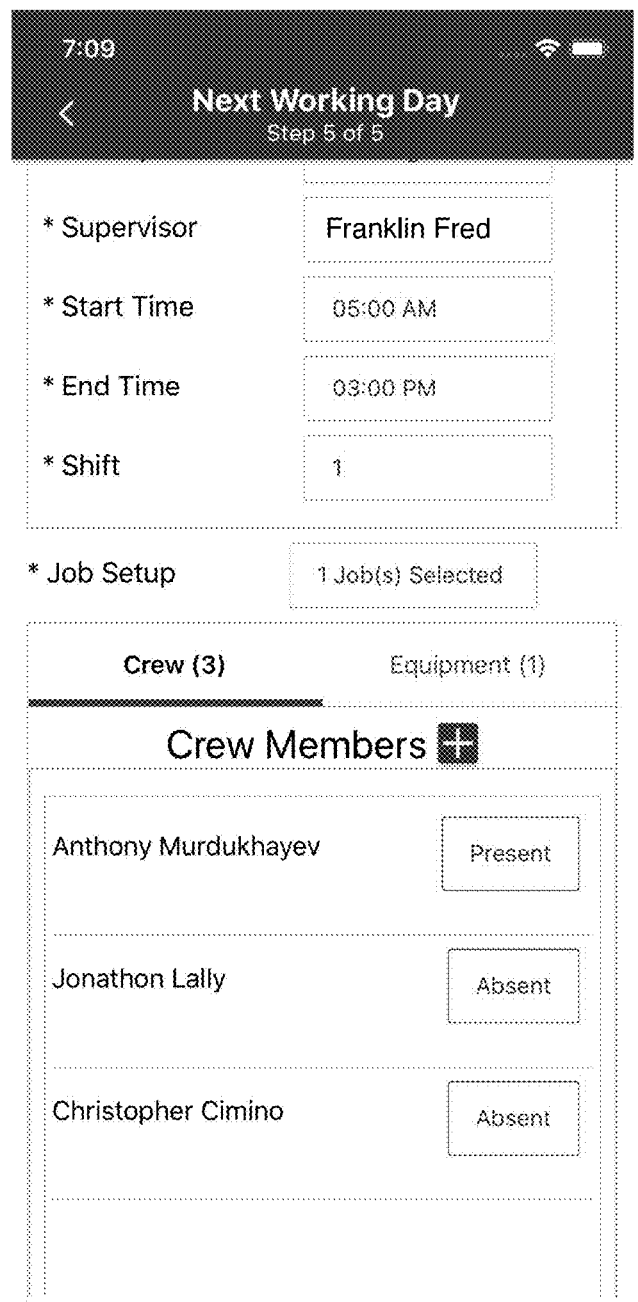

FIG. 20 shows an asphalt calculator interface showing input boxes for various mathematical requirements associated with an asphalt job such as length, width, and thickness within density. There is also shown buttons for calculate and clear values functions as well as a display of the results.

FIGS. 21-30 show timesheet interfaces within the Timesheet Module including various steps of entering time entry information.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

It will be apparent to one of skill in the art that described herein is a novel apparatus, system and method for a dynamic mobile application that provides a real time collection, analysis and reporting information management platform for building and construction projects, commercial electric projects, overhead lines work, underground electric projects, emergency services and disaster management tasks. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

The invention claimed is:

1. A mobile device secure access method, the method comprising: logging, by one or more processors in a mobile device executing a user login module comprising executable code in a mobile device application residing in the mobile device having a graphical user interface, a user into the mobile device application, said logging the user comprising:
   providing an access code pertaining to access of the mobile device application for a use case;
   accessing a perimeter server for the use case, wherein accessing the perimeter server provides access through a firewall to a secure internal API server via a call function, wherein the call function collects active directory groups associated with the use case;
   reconciling the access code to a user account of the user, said user account being specific for the use case;
   authenticating the user to access the mobile device application based on information comprising the access code and a unique identifier of the mobile device, said unique identifier having been set by a manufacturer of the mobile device;
   executing an authenticate perform step to determine a current permission level of the user, said permission level permitting the mobile device application to be made visible to the user via the graphical user interface;

executing a data synchronization step that synchronizes data with the mobile device by synchronizing the mobile device application with a database that stores the data, wherein the user has a security level that permits the data synchronization step to be executed;

launching, in response to processing the access code for the use case, a subset of modules from the active directory groups associated with the use case from the secure internal API server; and rendering the subset of modules from the active directory groups associated with the use case on the graphical user interface that are launched in response to the processing of the access code for the use case.

2. The method of claim 1, further comprising determining whether the user possesses current project data, wherein said determining comprises:

navigating the data synchronization step for said current project data in order to synchronize the mobile device application and said database for access;

navigating the user to an application launcher module viewable to the user via the graphical user interface;

determining a visibility of the application launcher module; and rendering the application launcher module to provide the user access to the mobile application via the graphical user interface.

3. The method of claim 1, further comprising determining whether the user possesses current communication data, wherein said determining comprises:

accessing the current communication data stored in the database;

displaying a determination notification viewable to user via the graphical user interface;

enabling for the user, a communication data input portal via the graphical user interface to upload new communication data;

enabling for the user, an expense data input portal via the graphical user interface to upload new expense data; and storing the new communication data and the new expense data input by the user in said database.

4. The method of claim 1, further comprising enabling for the user, a photo collection option, wherein said enabling said photo collection option comprises:

launching a job site photo module viewable to the user via said graphical user interface;

displaying at least one project listed in said database;

determining the existence of a job site photo for said at least one project; providing the user access to the job site photo;

providing the user the ability to photograph a job site;

uploading the job site photo to said database; and providing access to the job site photo to the enterprise.

5. The method of claim 1, further comprising providing the user with at least one employee data, wherein said providing comprises:

launching a workforce module viewable to the user via the graphical user interface;

providing the user with at least one filtering option to search for employees stored in said database; and providing the user an ability to select at least one employee for at least one project.

6. The method of claim 5, further comprising providing the user with the at least one employee data for the at least one employee, wherein said providing comprises:

allowing the user to enter additional information for the at least one employee;

allowing the user to perform a review of the at least one employee;

displaying a skill set for the at least one employee;

displaying assets assigned to the at least one employee; and selecting said assets to be checked out based upon predetermined criteria.

7. The method of claim 1, further comprising providing the user with time keeping data for the at least one employee, wherein said providing comprises:

launching a time sheet module viewable to the user via the graphical user interface;

providing employee information, where the employee information includes default job and phase data, individual time entry data and next day crew compensation;

providing a time sheet data generating operation including: creating a time sheet entry; importing the time sheet entry into a payroll database; and providing the time sheet entry to at least one customer for said project.

8. The method of claim 1, further comprising:

updating, uploading, and storing current project data, current communication data, equipment location data, employee data, and time keeping data to a database.

9. The method of claim 1, further comprising:

establishing, by said one or more processors, a connection between said mobile device application and a perimeter server external to a domain of an entity associated with said mobile device application; and providing, by said one or more processors, access, via a firewall internal to an API server, between said perimeter server and said mobile device application.

10. The method of claim 9, wherein said API server is configured to enable authentication and communications with third party APis, and access to internal data stores for data retrieval, manipulation, and persistence.

11. A mobile device comprising one or more processors coupled to a computer-readable memory unit, said memory unit comprising instructions that when executed by the one or more processors executes a mobile device secure access method comprising:

logging, by the one or more processors in the mobile device executing a user login module comprising executable code in a mobile device application residing in the mobile device having a graphical user interface, a user into the mobile device application, said logging the user comprising:

providing an access code pertaining to access of the mobile device application for a use case;

accessing a perimeter server for the use case, wherein accessing the perimeter server provides access through a firewall to a secure internal API server via a call function, wherein the call function collects active directory groups associated with the use case;

reconciling the access code to a user account of the user, said user account being specific for the use case;

authenticating the user to access the mobile device application based on information comprising the access code and a unique identifier of the mobile device, said unique identifier having been set by a manufacturer of the mobile device;

executing an authenticate perform step to determine a current permission level of the user, said permission level permitting the mobile device application to be made visible to the user via the graphical user interface;

executing a data synchronization step that synchronizes data with the mobile device by synchronizing the mobile device application with a database that stores the data, and wherein the user has a security level that permits the data synchronization step to be executed;

launching, in response to processing the access code for the use case, a subset of modules from the active directory groups associated with the use case from the secure internal API server; and rendering the subset of modules from the active directory groups associated with the use case on the graphical user interface that are launched in response to the processing of the access code for the use case.

12. The mobile device of claim 11, wherein said method further comprises determining whether the user possesses said current project data, and wherein said determining comprises:

navigating the data synchronization step for said current project data in order to synchronize the mobile device application and said database for access;

navigating the user to an application launcher module viewable to the user via the graphical user interface;

determining a visibility of the application launcher module; and rendering the application launcher module to provide the user access to the mobile application via the graphical user interface.

13. The mobile device of claim 11, wherein said method further comprises determining whether the user possesses current communication data, and wherein said determining comprises:

accessing the current communication data stored in the database;

displaying a determination notification viewable to user via the graphical user interface;

enabling for the user, a communication data input portal via the graphical user interface to upload new communication data;

enabling for the user, an expense data input portal via the graphical user interface to upload new expense data; and storing the new communication data and the new expense data input by the user in said database.

14. The mobile device of claim 11, wherein said method further comprises enabling for the user, a photo collection option, and wherein said enabling said photo collection option comprises:

launching a job site photo module viewable to the user via said graphical user interface; displaying at least one project listed in said database;

determining the existence of a job site photo for said at least one project;

providing the user access to the job site photo;

providing the user an ability to photograph a job site;

uploading the job site photo to said database; and providing access to the job site photo to the enterprise.

15. The mobile device of claim 11, wherein said method further comprises providing the user with at least one employee data, and wherein said providing comprises:

launching a workforce module viewable to the user via the graphical user interface;

providing the user with at least one filtering option to search for employees stored in said database; and providing the user the ability to select at least one employee for at least one project.

16. The mobile device of claim 15, wherein said method further comprises providing the user with the at least one employee data for the at least one employee, wherein said providing comprises:

allowing the user to enter additional information for the at least one employee;

allowing the user to perform a review of the at least one employee; displaying a skill set for the at least one employee;

displaying assets assigned to the at least one employee; and selecting said assets to be checked out based upon predetermined criteria.

17. The mobile device of claim 11, wherein said method further comprises providing the user with time keeping data for the at least one employee, and wherein said providing comprises:

launching a time sheet module viewable to the user via the graphical user interface;

providing employee information, where the employee information includes default job and phase data, individual time entry data and next day crew compensation;

providing a time sheet data generating operation including: creating a time sheet entry; importing the time sheet entry into a payroll database; and providing the time sheet entry to at least one customer for said project.

18. The mobile device of claim 11, wherein said method further comprises:

updating, uploading, and storing current project data, current communication data, equipment location data, employee data, and time keeping data to a database programmed to store said data.

19. A computer program product, comprising a computer readable hardware storage device storing a computer readable program code, said computer readable program code comprising an algorithm that when executed by one or more processors of a mobile device implements a mobile device secure access method, said method comprising:

logging, by the one or more processors in the mobile device executing a user login module comprising executable code in a mobile device application residing in the mobile device having a graphical user interface, a user into the mobile device application, said logging the user comprising:

providing an access code pertaining to access of the mobile device application for a use case;

reconciling the access code to a user account of the user, said user account being specific for the use case;

accessing a perimeter server for the use case, wherein accessing the perimeter server provides access through a firewall to a secure internal API server via a call function, wherein the call function collects active directory groups associated with the use case;

authenticating the user to access the mobile device application based on information comprising the access code and a unique identifier of the mobile device, said unique identifier having been set by a manufacturer of the mobile device;

executing an authenticate perform step to determine a current permission level of the user, said permission level permitting the mobile device application to be made visible to the user via the graphical user interface;

executing a data synchronization step that synchronizes data with the mobile device by synchronizing the mobile device application with a database that stores the data, and wherein the user has a security level that permits the data synchronization step to be executed; and launching, in response to processing the access code for the use case, a subset of modules from the active directory groups associated with the use case from the secure internal API server; and rendering the subset of modules from the active directory groups associated with the use case on the graphical user interface that are launched in response to the processing of the access code for the use case.

* * * * *